US007312901B2

(12) United States Patent
Yamada et al.

(10) Patent No.: US 7,312,901 B2
(45) Date of Patent: Dec. 25, 2007

(54) IMAGE PROCESSING APPARATUS, IMAGE PROCESSING METHOD, AND PROGRAM

(75) Inventors: Akitoshi Yamada, Kanagawa (JP); Hiromitsu Hirabayashi, Kanagawa (JP); Kentaro Yano, Kanagawa (JP); Masao Kato, Kanagawa (JP); Kazuya Imafuku, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1022 days.

(21) Appl. No.: 10/387,424

(22) Filed: Mar. 14, 2003

(65) Prior Publication Data

US 2003/0174352 A1 Sep. 18, 2003

(30) Foreign Application Priority Data

Mar. 15, 2002 (JP) .............................. 2002-072146
Mar. 15, 2002 (JP) .............................. 2002-072147

(51) Int. Cl.
*H04N 1/405* (2006.01)
(52) U.S. Cl. ..................... 358/3.14; 358/3.13; 358/3.03
(58) Field of Classification Search ........ 358/3.03–3.06, 358/3.13–3.14, 1.9, 2.1, 3.21, 1.16; 382/251–252
See application file for complete search history.

(56) References Cited

U.S. PATENT DOCUMENTS

| 4,313,124 A | 1/1982 | Hara ....................... 346/140 R |
| 4,345,262 A | 8/1982 | Shirato et al. .......... 346/140 R |
| 4,459,600 A | 7/1984 | Sato et al. .............. 346/140 R |
| 4,463,359 A | 7/1984 | Ayata et al. .................. 346/1.1 |
| 4,547,811 A * | 10/1985 | Ochi et al. .................. 382/176 |
| 4,558,333 A | 12/1985 | Sugitani et al. ......... 346/140 R |
| 4,608,577 A | 8/1986 | Hori ....................... 346/140 R |
| 4,723,129 A | 2/1988 | Endo et al. ................... 346/1.1 |
| 4,740,796 A | 4/1988 | Endo et al. ................... 346/1.1 |
| 4,833,531 A * | 5/1989 | Abe et al. .................... 382/300 |

(Continued)

FOREIGN PATENT DOCUMENTS

EP        1 211 884         6/2002

(Continued)

OTHER PUBLICATIONS

R.W. Floyd, et al., "An Adaptive Algorithm for Spatial Greyscale", Proceeding of the Society For Information Display, vol. 17/2, Second Quarter 1976, pp. 75-77.

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

In an image processing apparatus which performs an error diffusion process to multivalued image data consisting of plural density components and outputs a result of the error diffusion process, the process result from a first error diffusion unit performing the error diffusion process based on a density value of a first density component included in the plural density components or the process result from a second error diffusion unit performing the error diffusion process based on the density value of the first density component and a density value of at least one density component included in other density components is selected according to a predetermined condition. Thus, even in an image process is performed to a larger number of gradations, a high-speed process can be achieved with simple structure, and the error diffusion process can be effectively performed to a shift of dot apply positions.

33 Claims, 20 Drawing Sheets

U.S. PATENT DOCUMENTS

| | | | | |
|---|---|---|---|---|
| 4,922,332 A * | 5/1990 | Taniguchi et al. | ........... | 358/528 |
| 5,289,293 A | 2/1994 | Kato et al. | ................... | 358/457 |
| 5,325,448 A * | 6/1994 | Katayama et al. | ........... | 382/270 |
| 5,351,137 A | 9/1994 | Kato et al. | ................... | 358/457 |
| 5,565,994 A | 10/1996 | Eschbach | ..................... | 358/298 |
| 5,739,917 A | 4/1998 | Shu et al. | ................... | 358/298 |
| 5,949,965 A | 9/1999 | Gondek | ...................... | 395/109 |
| 5,973,803 A | 10/1999 | Cheung et al. | .............. | 358/534 |
| 6,057,933 A | 5/2000 | Hudson et al. | .............. | 358/1.9 |
| 6,061,145 A | 5/2000 | Kanda et al. | ................ | 358/1.9 |
| 6,148,031 A | 11/2000 | Kato | ..................... | 375/240.13 |
| 6,285,464 B1 * | 9/2001 | Katayama et al. | ........ | 358/3.05 |
| 6,363,172 B1 | 3/2002 | Cheung et al. | ............. | 382/167 |
| 6,394,612 B1 | 5/2002 | Yano | ........................... | 357/457 |
| 6,542,642 B2 | 4/2003 | Takizawa et al. | ........... | 382/236 |
| 2002/0097456 A1 | 7/2002 | Yamada et al. | ............. | 358/536 |
| 2006/0126957 A1 * | 6/2006 | Roberts | ..................... | 358/3.03 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 8-279920 | 10/1996 |
| JP | 9-139841 | 5/1997 |
| JP | 11-10918 | 1/1999 |

* cited by examiner

FIG. 2
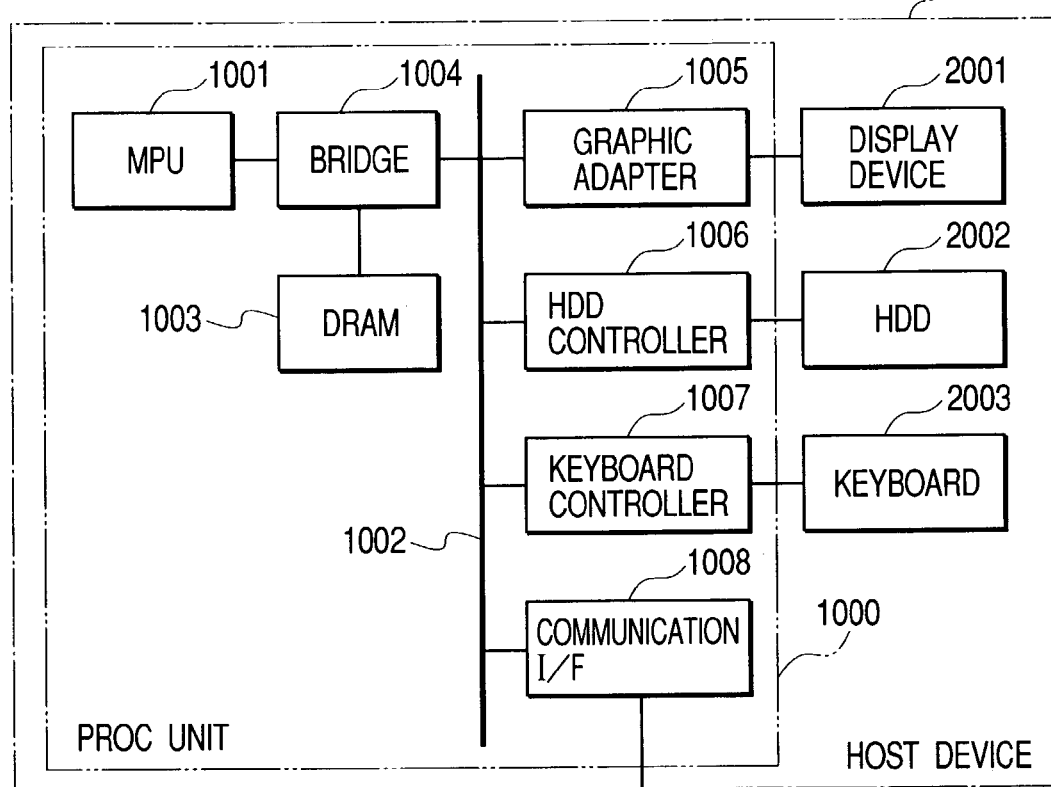
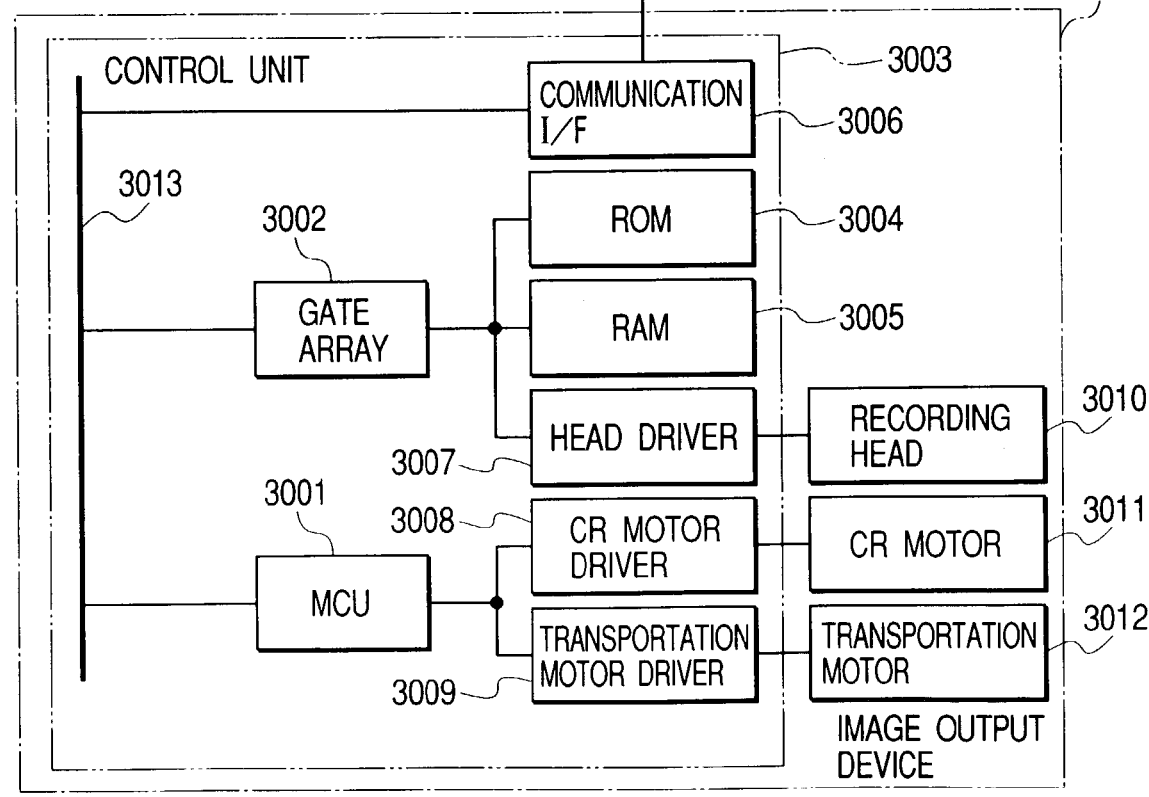

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program to execute the image processing method. More specifically, the present invention relates to image processing apparatus and method which perform, as a pseudo-halftone process, an error diffusion process to multivalued image data, and a program to execute the image processing method.

2. Related Background Art

Conventionally, an error diffusion method which is described in, e.g., "An Adaptive Algorithm for Spatial Gray Scale" in Society for Information Display 1975 Symposium Digest of Technical Papers, 1975, pp. 36 is known as a pseudo-gradation process to represent a multivalued image by binary data. In this method, it is first assumed that a target pixel is P, a density of the target pixel P is v, densities of peripheral pixels P0, P1, P2 and P3 of the target pixel P are respectively v0, v1, v2 and v3, and a threshold for binarization is T. Then, a binarization error E at the target pixel P is diffused to the peripheral pixels P0, P1, P2 and P3 respectively with experientially obtained weighting factors W1, W1, W2 and W3, whereby an average density is macroscopically equated with the density of the former image.

For example, if it is assumed that output binary data is o, it is possible to represent:

if $v \geq T$, then $o=1$, $E = v - V_{max}$ if $v < T$, then $o=0$, $E = v - V_{min}$ \hfill (1)

($V_{max}$: maximum density, $V_{min}$: minimum density)

$v0 = v0 + E \times W0$ \hfill (2)

$v1 = v1 + E \times W1$ \hfill (3)

$v2 = v2 + E \times W2$ \hfill (4)

$v3 = v3 + E \times W3$ \hfill (5)

(examples of weighting factors: W0=7/16, W1=1/16, W2=5/16, W3=3/16)

Conventionally, for example, in a case where a color ink-jet printer or the like outputs a multivalued image by using C (cyan), M (magenta), Y (yellow) and K (black) inks, the pseudo-gradation process is independently performed for each color by using the error diffusion method or the like. Thus, even if a visual characteristic is excellent for one color, such an excellent visual characteristic is not necessarily obtained for a combination of two or more colors.

In order to solve such a problem, for example, Japanese Patent Application Laid-Open Nos. 8-279920 and 11-10918 disclose a pseudo-halftone processing method which can obtain, even if two or more colors are combined to be used, an excellent visual characteristic by combining the error diffusion methods for these colors.

Furthermore, Japanese Patent Application Laid-Open No. 9-139841 discloses a method which can obtain, even if two or more colors are combined to be used, an excellent visual characteristic by performing a pseudo-halftone process independently for each of these colors and then correcting an output value based on the sum total of processed input values.

Particularly, in order to reduce graininess of the intermediate density area in a color image, it is known that it is effective to perform image formation not to overlap dots of C and M components. In this connection, the following technique is used to achieve such a reduction of graininess. FIG. 16 is a view for explaining image formation control according to a conventional ink-jet recording method.

In this case, it should be noted that the image formation control will be explained on the premise that image data is the multivalued data of eight bits (0 to 255 gradation values) for each density component (Y, M, C, K) in relation to each pixel.

If the density values of the C and M components of the target pixel in a multivalued color image are assumed respectively as Ct and Mt and the density values of the C and M components of the original image are assumed respectively as C and M, equations $Ct = C + C_{err}$ and $Mt = M + M_{err}$ are satisfied. Here, the symbols $C_{err}$ and $M_{err}$ are the values obtained by respectively performing the error diffusion to the C and M components of the target pixel.

With respect to the image formation of the C and M components shown in FIG. 16, following four kinds of image formation controls are performed in accordance with the densities of the C and M components of the target pixel.

1. If the sum (Ct+Mt) is equal to or less than a threshold (Threshold1), that is, if it belongs to an area R1 of FIG. 16, the dot recording using the C and M inks is not performed.
2. If the sum (Ct+Mt) exceeds the threshold (Threshold1) and is less than another threshold (Threshold2) and Ct>Mt, that is, if it belongs to an area R2 of FIG. 16, the dot recording is performing by using only the C ink.
3. If the sum (Ct+Mt) exceeds the threshold (Threshold1) and is less than the threshold (Threshold2) and Ct≦Mt, that is, if it belongs to an area R3 of FIG. 16, the dot recording is performing by using only the M ink.
4. If the sum (Ct+Mt) is equal to or higher than the threshold (Threshold2), that is, if it belongs to an area R4 of FIG. 16, the dot recording is performing by using the C and M inks.

In the above image information controls, it is assumed that Threshold1<Threshold2 is satisfied.

However, in the conventional technique, according as the number of gradations in case of the quantization increases, a judgment expression becomes complicated and thus a processing time is prolonged.

Here, an example of a case where each of the C and M components is quantized into three values will be shown as follows.

```
Ct = C + C_err
Mt = M + M_err
C_out = 0
M_out = 0
If (Ct + Mt > Threshold1)
    If (Ct + Mt > Threshold1)
        If (Ct > Mt)
            C_out = 1
        else
            M_out = 1
    else
        If (Ct + Mt < Threshold2)
            If (Ct > Mt + Const1)
                C_out = 2
            else
                If (Mt > Ct + Const1)
                    M_out = 2
```

-continued

```
        else
            C_out = 1
            M_out = 1
    else
        If (Ct + Mt < Threshold3)
            If (Ct > Mt)
                C_out = 2
                M_out = 1
            else
                C_out = 1
                M_out = 2
        else
            C_out = 2
            M_out = 2
```

As above, such a complicated process is necessary even to only quantize the color component into three values, whereby further complicated processes are necessary to quantize the color component into a larger number of gradation values.

Furthermore, if it is controlled to not overlap two or more colors as performing the multivalued error diffusion process, a difference (i.e., improper dislocation) of the positions where dots are respectively formed when the ink droplets are actually output and applied thereto by the printer occurs. Thus, a following problem to be solved occurs in the image. Hereinafter, the problem will be explained with reference to FIGS. 17A, 17B, 18A and 18B. FIGS. 17A and 17B show the output images of the highlight portion for explaining the conventional problem to be solved, and FIGS. 18A and 18B show the output images of the halftone portion for explaining the conventional problem to be solved.

More specifically, FIG. 17A shows a resultant example of the paper face where the printer outputs of two colors according to the simultaneous error diffusion in the highlight portion are formed, and, in FIG. 17A, a dot (dotted circle) 601 represents the C ink dot, and a dot (hatched circle) 602 represents the M ink dot. In the resultant example shown in FIG. 17A, the paper face is evenly infilled with the C ink dots 601 and the M ink dots 602, whereby this resultant example represents an excellent image. On the contrary, FIG. 17B shows a case where the C ink dot group of FIG. 17A has been entirely shifted leftward by the distance substantially the same as the dot diameter. In this case, although there are certain differences in the dot arrangements on the paper face, since the C ink dot 601 and the M ink dot 602 do not yet overlap mutually, an area factor which represents a ratio of the ink covering the paper face does not change.

FIG. 18A shows a resultant example of the paper face where the printer outputs of two colors according to the simultaneous error diffusion in the halftone portion are formed, and, in FIG. 18A, a dot (dotted circle) 701 represents the C ink dot, and a dot (hatched circle) 702 represents the M ink dot. In the resultant example shown in FIG. 18A, the paper face is evenly infilled with the C ink dots 701 and the M ink dots 702, whereby this resultant example represents an excellent image. On the contrary, FIG. 18B shows a case where the C ink dot group of FIG. 18A has been entirely shifted leftward by the distance substantially the same as the dot diameter. In this case, unlike with the transition from FIG. 17A to FIG. 17B, the C ink dots 701 and the M ink dots 702 overlap frequently, whereby the area factor which represents the ratio of the ink covering the paper face highly changes.

The change of the area factor is easily recognized or viewed as a great difference by human's eyes. Besides, as the reasons why the difference between the C ink dot position and the M ink dot position occurs, with respect to the main scan direction, for example, vibration of a carriage motor, deflation of a medium such as paper or the like to which an image is output, expansion and secular changes of the medium due to ink absorption of the medium itself, differences in discharge speeds of the respective color inks, and the like are cited. On the other hand, with respect to the sub scan direction, for example, uneven paper feed due to eccentricity of paper feed rollers or gears, unsteady movement of the upper and/or lower edges of paper, and the like are cited.

The above reasons include many factors which are changed according to the position of the medium to which the output is performed. Therefore, if the area factor changes according to the position of the medium, such a change of the area factor is recognized as great unevenness in the output image.

SUMMARY OF THE INVENTION

The present invention is made in consideration of the above conventional problem, and an object thereof is to provide image processing apparatus and method which can, even in case of performing an image process of a larger number of gradations, perform a high-speed process by means of simple structure and effectively operate on differences or shifts of dot apply positions, and a program to execute the image processing method.

Another object of the present invention is to provide image processing apparatus and method which can, even in case of performing an image process of a larger number of gradations, perform a high-speed process, make the size of held table information compact, and perform an excellent image process to differences of dot apply positions, and a program to execute the image processing method.

In order to achieve the above objects, the present invention is characterized by providing an image processing apparatus which performs an error diffusion process to multivalued image data consisting of plural density components outputs a result of the error diffusion process, and comprises: a first error diffusion means for performing the error diffusion process on the basis of a density value of a first density component included in the plural density components; a second error diffusion means for performing the error diffusion process on the basis of the density value of the first density component and a density value of at least one of other density components included in the plural density components; and a determination means for determining which of the first error diffusion means and the second error diffusion means should be used, in accordance with a predetermined condition.

Furthermore, in the above image processing apparatus, the present invention is further characterized in that, in a case where the density value of the first density component is within a predetermined area, the predetermined condition is a condition which has a characteristic that probability of using the first error diffusion means is higher than probability of using the second error diffusion means in an average in the predetermined area.

Furthermore, in the above image processing apparatus, the present invention is further characterized in that the predetermined area is an area which is included in at least one of an area where the density value of the first density component is equal to or smaller than a minimum value of a quantization representative value larger than 0 and an area where the density value of the first density component is equal to or larger than a second-largest quantization representative value.

Furthermore, in the above image processing apparatus, the present invention is further characterized in that the predetermined area is an area which includes at least one of an area where the density value of the first density component is equal to or smaller than a minimum value of a quantization representative value larger than 0 and an area where the density value of the first density component is equal to or larger than a second-largest quantization representative value.

Besides, in order to achieve the above objects, the present invention is characterized by providing an image processing apparatus which includes an error diffusion processing means for performing an error diffusion process to multi-valued image data consisting of plural density components, and further comprises: a determination means for determining, in a case where the error diffusion process is performed to a first density component being one of the plural density components, a threshold to be used in the error diffusion process, on the basis of a density value of a second density component being at least one of the plural density components; and a comparison means for comparing a value, obtained by adding a predetermined value to the threshold determined by the determination means, with a density value of the first density component, and outputting a comparison result, wherein the error diffusion processing means performs the error diffusion process on the basis of the comparison result output by the comparison means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the present invention and, together with the description, serve to explain the principles of the invention.

FIG. 2 is a block diagram showing an outline of the structure of hardware in a host device 51 and an image output device 52 for structuring the information processing system shown in FIG. 1;

DETAILED DESCRIPTION OF THE PREFERRED EMBODIMENTS

The preferred embodiments of the present invention will now be described in detail with reference to the accompanying drawings.

Hereinafter, an image processing apparatus according to the present invention will be explained in detail.

Common Embodiments

The entire outline of an image processing system, the hardware structure thereof, the software structure thereof and the image process thereof which are common to the embodiments of the present invention will be explained.

1. Entire Outline of Image Processing System

Figure 1:
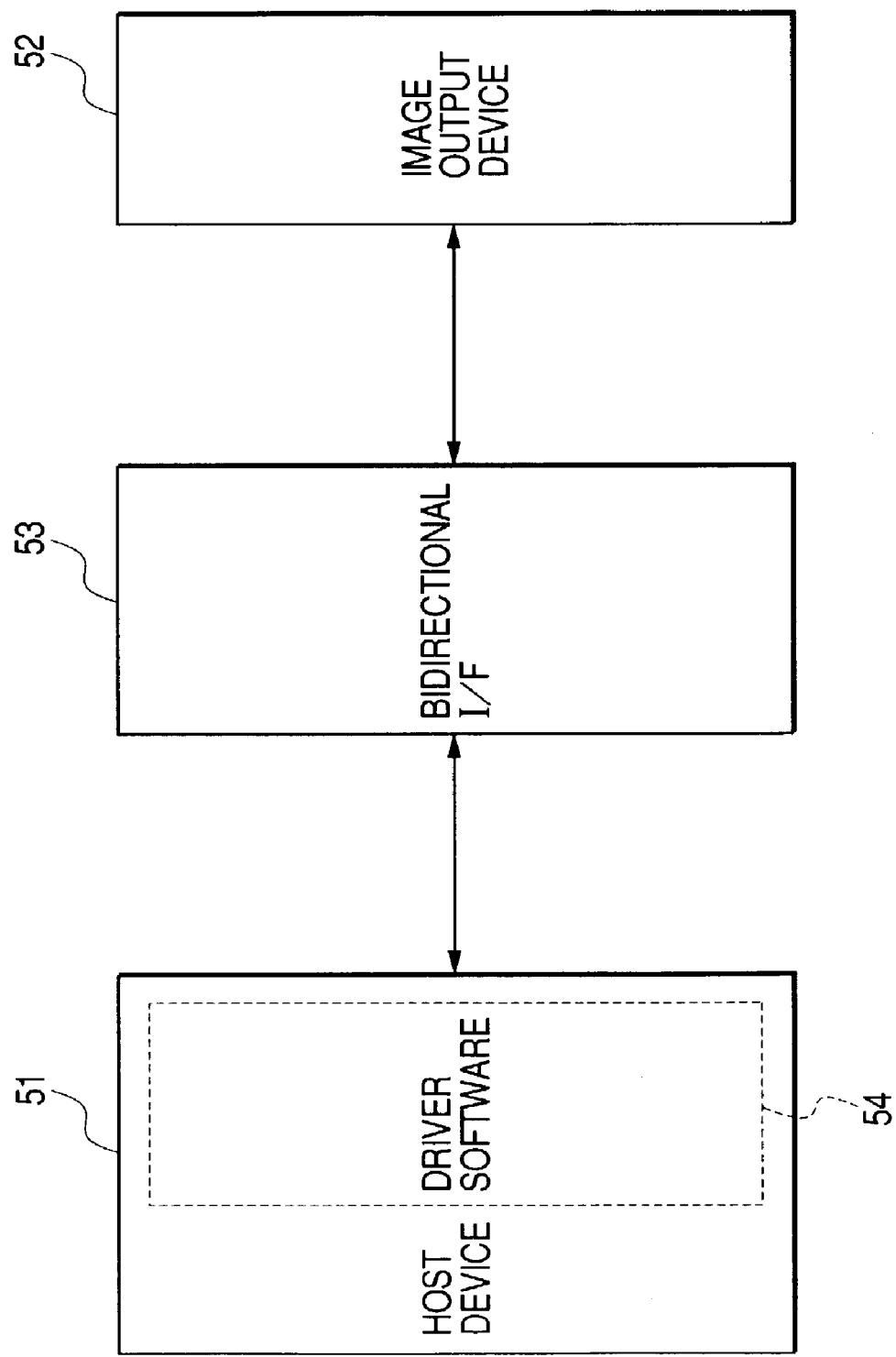
FIG. 1 is a block diagram showing an outline of the structure of an information processing system used for structuring an image processing apparatus according to common embodiments of the present invention.

FIG. 1 is a block diagram showing an outline of the structure of the image processing system having an image processing apparatus according to the embodiments of the present invention.

In FIG. 1, the image processing system, which is structured by a personal computer and the like, has a host device 51 functions as the image processing apparatus and an image output device 52 structured by an ink-jet printer or the like, which are connected each other by a bidirectional interface 53.

The host device 51 has an MPU (microprocessing unit), a memory, a hard disk drive being a large scale storage device, a keyboard and a display unit composed of a CRT or the like which are to be described later, and driver software 54, to which the present invention is applied, is memorized (stored) in the memory.

2. Hardware Structure of Host Device 51 and Image Output Device 52

FIG. 2 is a block diagram showing an outline of the hardware structure of the host device 51 and the image output device 52 shown in FIG. 1.

In FIG. 2, the host device 51 is structured by a processing unit 1000, a display device 2001, a hard disk drive (HDD) 2002, which stores a control program and data, and a keyboard 2003.

The processing unit 1000 has an MPU 1001 for entirely controlling the host device 51 in accordance with the control program, a bus 1002 for mutually connecting each of structural sections in the processing unit 1000, a DRAM 1003 for temporarily storing the control program, data and the like to be performed by the MPU 1001, a bridge 1004 for connecting the system bus 1002 with the MPU 1001 and a graphic adapter 1005 having a control function used for causing the display device 2001 to display graphic information.

Further, the processing unit 1000 has an HDD controller 1006 for controlling an interface with the HDD 2002, a keyboard controller 1007 for controlling an interface with the keyboard 2003 and a communication I/F 1008 being a parallel interface for controlling the communication with the image output device 52 according to IEEE (Institute of Electrical and Electronic Engineers) 1284 Standard.

The processing unit 1000 is connected to the display device 2001 through the graphic adapter 1005, connected to the HDD 2002 through the HDD controller 1006 and connected to the keyboard 2003 through the keyboard controller 1007.

The image output device 52 structured by a control circuit unit 3003, a recording head 3010, a carrier (CR) motor 3011 for driving a carrier which carries the recording head 3010 and a transportation motor 3012 for transporting sheets.

The control circuit unit 3003, which has a control program execution function and a peripheral devices control function, includes a MCU (Micro Controller Unit) 3001 for entirely controlling the image output device 52, a system bus 3013 for mutually connecting each of structural sections in the control circuit unit 3003 and a gate array (G.A.) 3002 which contains such mechanisms of supplying recording data to the recording head 3010, decoding a memory address and generating a control pulse for the carrier motor, and the like as a control circuit.

Furthermore, the control circuit unit 3003 has a ROM 3004 for storing a control program to be executed by the MCU 3001, host print information and the like, a DRAM 3005 for storing various data (image recording information, recording data to be supplied to a head, and the like), a communication I/F 3006 being a parallel interface of controlling the communication with the host device 51 according to IEEE 1284 Standard and a head driver 3007 for converting data into an electric signal used for driving the recording head 3010 on the basis of a head recording signal output from the gate array 3002.

Moreover, the control circuit unit 3003 has a CR (Carriage Return) motor driver 3008 for converting a carrier motor control pulse output from the gate array 3002 into an electric signal actually used to drive the CR motor 3011 and a transportation motor driver 3009 for converting a transportation motor control pulse output from the MCU 3001 into an electric signal actually used to drive the transportation motor 3012.

Next, the concrete structure of the image output device 52 will be explained.

Figure 3:
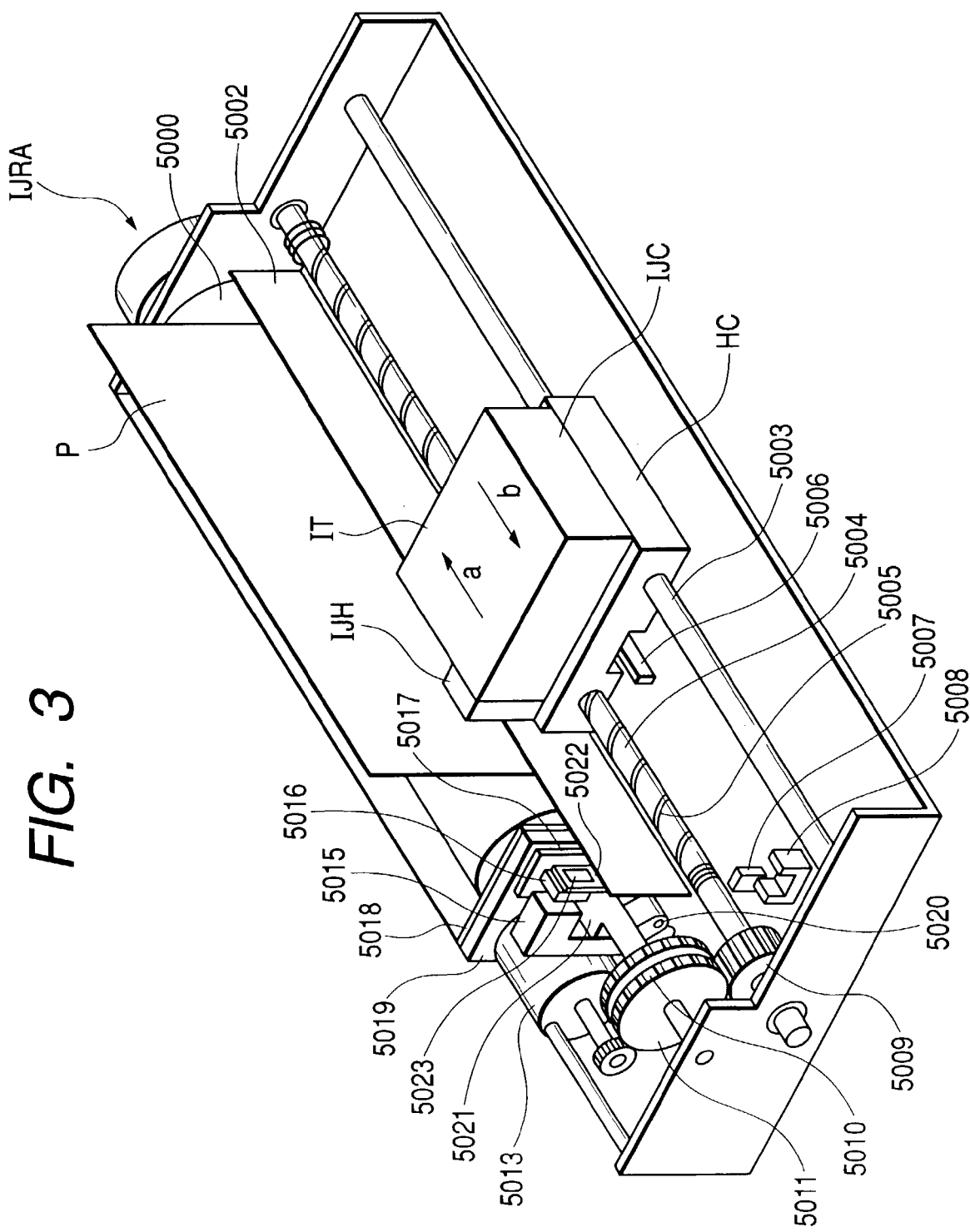
FIG. 3 is a perspective view concretely showing the structure of the image output device 52 shown in FIG. 2.

FIG. 3 is a perspective view showing an outline of the structure of an ink-jet printer being a representative embodiment of the image output device 52 shown in FIG. 1.

In FIG. 3, an ink-jet printer IJRA has a recording head IJH (recording head 3010), a carriage HC, an ink tank IT and an ink cartridge IJC together with the control circuit unit 3003 shown in FIG. 2. The recording head IJH can record a color image by using at least four colors ink of yellow (Y), magenta (M), cyan (C) and black (K) on the basis of multivalued density data for each of the components of Y, M, C and K.

The carriage HC is interlocked with a spiral groove 5004 engraved on a lead screw 5005, which rotates through driving power transmission gears 5009, 5010 and 5011 while relationally operating with the forward/backward rotation of a driving motor 5013. Then, the carriage HC which has a pin (not shown) reciprocally moves in the directions indicated by arrows a and b while being supported by a guide rail 5003.

A unit-type ink-jet cartridge JJC which includes the recording head IJH and the ink tank IT is mounted on the carriage HC. A sheet pressing plate 5002 presses a recording sheet P on a platen 5000 for an entire area of corresponding to the moving direction of the carriage HC. Photocouplers 5007 and 5008 act as home position detection units used for switching the rotating direction of the driving motor 5013 upon confirming existence of a lever 5006 provided at the carriage HC.

A supporting member 5016 supports a capping member 5022 for capping a front face of the recording head IJH. An absorbing unit 5015, which performs absorption for an inner part of the capping member 5022, performs absorption recovery of the recording head IJH through an aperture 5023 provided in a cap. A member 5019 enables a cleaning blade 5017 to move in the front/behind direction, and those are supported by a body supporting plate 5018. It is needless to say that the cleaning blade 5017 is not limited to that used in the present embodiment but the known cleaning blade is applicable.

A lever 5021 which is used for starting the absorption for the absorption recovery moves in accordance with the move of a cam 5020 interlocked with the carriage HC. The driving power from the driving motor is switched by the known transmission mechanism such as a clutch switching or the like to control the move of the lever 5021.

With respect to the capping process, the cleaning process and the absorption recovery, it is structured that a desired process can be executed at the corresponded position for the process by the action of the lead screw 5005 when the carriage HC reaches an area of the home position side. However, if a desired operation is to be performed at the known timing, both methods can be applied to the present example.

As described above, the changeable ink cartridge IJC may be structured in a state that the ink tank IT and the recording head IJH are formed in a unit. However, it may be structured in a state that the ink tank IT can be separated from the recording head IJH and only the ink tank IT can be changed when the ink has been used up.

3. Outline of Structure of Software and Outline of Image Process

Figure 4:
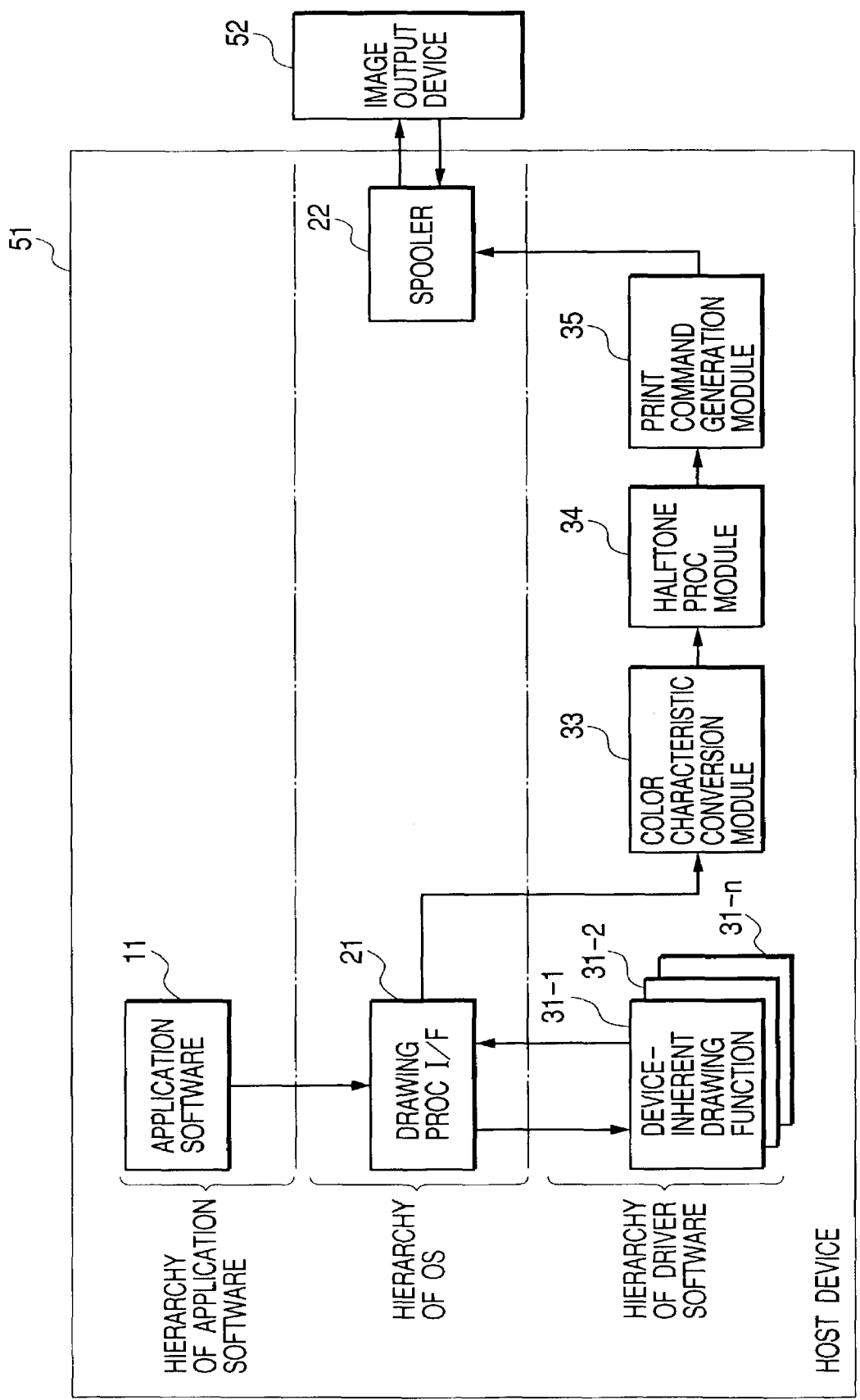
FIG. 4 is a block diagram showing the structure of software to be used in the information processing system shown in FIG. 1.

FIG. 4 is a block diagram showing the structure of software which is used in the image processing system shown in FIG. 1.

In FIG. 4, the host device 51 prepares three software of application software, an operating system (OS) and driver software which have the hierarchy structure. The above three software cooperatively execute an image process in order to output recording data to the image output device 52.

In the hierarchy of the application software, application software 11 is provided. In the hierarchy of the OS (operating system), a drawing process interface 21 which receives a drawing instruction sent from the application software 11 and a spooler 22 which sends generated image data to the image output device 52 such as an ink-jet printer or the like are provided.

In the hierarchy of the driver software, there provided device-inherent drawing functions 31-1, 31-2, . . . , 31-n in which expression formats inherent in the image output device 52 are stored, a color characteristic conversion module 33 which receives linear-divided image information sent from the OS and then performs conversion from a color system inside the driver software to a color system inherent in the device, a halftoning (halftone process) module 34 for converting the data from the color characteristic conversion module 33 into data of the quantizing amount which indicates the state of each pixel of the device and a print command generation module 35 for outputting data, which is obtained by adding a command for the image output device 52 to the halftone processed image data, to the spooler 22.

In the present embodiment, it is structured that sections individually depending on the image output device 52 are treated by the device-inherent drawing functions 31-1, 31-2, . . . , 31-n, program components depending on the units individually equipped to the image output device 52 are separated from the program which can be commonly processed and an essential processing part of the driver software is separated from an individual image output device.

An image process is executed to the linear-divided image information, which was converted into the data of the quantizing amount, by the color characteristic conversion module 33, the halftone processing module 34 or the like, and the data compression/command addition is performed by the print command generation module 35, and then the processed data is output to the image output device 52 through the spooler 22 provided in the OS (Operating System).

Next, an outline of an image process to be executed in the image processing system shown in FIG. 1 will be concretely explained.

Figure 5:
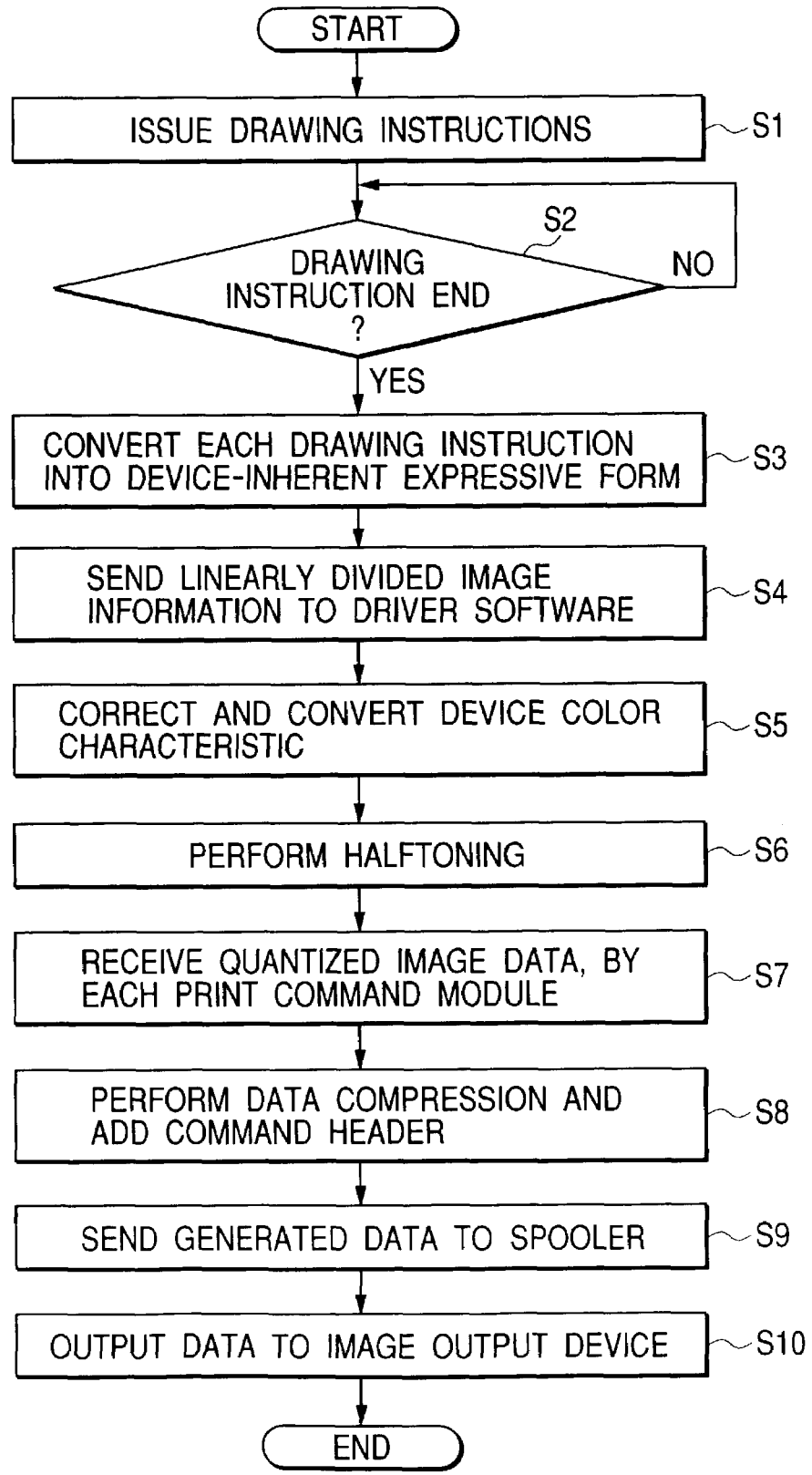
FIG. 5 is a flow chart showing a procedure of an image process according to the software structure of the information processing system shown in FIG. 4.

FIG. 5 is a flow chart indicating the image process to be executed in the image processing system shown in FIG. 1.

In FIG. 5, when the application software 11 outputs image data to the image output device 52, initially, the application software 11 issues drawing instructions such as "character", "line", "figure", "bit-map" and the like to the device-inherent drawing functions 31-1, 31-2, . . . , 31-n inside the driver software through the drawing process interface 21 provided in the OS (step S1).

Next, it is judged whether or not the drawing instruction used in structuring the screen/sheet to be printed, ends (step S2). When the drawing instruction ends (YES in the step S2), the OS converts each drawing instruction from an inside form of the OS into a device-inherent expressive form (form obtained by dividing each drawing unit in linear) while calling the device-inherent drawing functions 31-1, 31-2, . . . , 31-n inside the driver software (step S3). Thereafter, data of the screen/sheet is sent to the driver software as the linear-divided image information (step S4).

In the driver software, color characteristic of the device is corrected by the color characteristic conversion module 33 and the conversion from the color system inside the driver software to the color system inherent in the device is performed (step S5). Further, the conversion (halftoning) into the data of the quantizing amount which indicates the state of each pixel of the device is performed by the halftone processing module 34 (step S6). It should be noted that the conversion into the data of the quantizing amount means to perform a generation of multivalued data while corresponding to a form of the data to be processed by the image output device 52. For example, when a recording process according to the image output device 52 is executed on the basis of binary data, a binarization process is executed. When the recording process according to the image output device 52 is executed on the basis of multivalued data (in order to execute the recording process according to depth of ink color and various amounts of ink), the generation of multivalued data is performed. As to the halftoning, the explanation will be given in each embodiment to be described later.

The print command generation module 35 receives the quantized (binarized or generation of multivalued data executed) image data (step S7). The print command generation module 35 processes the quantized image information by different methods while fitting to characteristic of the image output device 52 and performs the data compression and the addition of a command header to the processed image information then generates the obtained data (step S8).

Next, the print command generation module 35 sends the generated data to the spooler 22 provided in the OS (step S9) and the data is output to the image output device 52 (step S10), then the process ends.

In the present embodiment, the above control method can be realized by executing the program based on the process shown in FIG. 5 stored in the HDD 2002 or the like inside the host device 51 by the MPU 1001.

As described above, since it is structured that the essential processing part of the driver software is separated from the individual image output device 52, the sharing of data processing between the driver software and the image output device 52 can be flexibly changed without damaging the structure of the driver software. As a result, it becomes favorable in aspects of maintaining and managing the software.

Next, an error diffusion process to be executed by the halftone processing module 34 in the present embodiment will be explained in detail. In the error diffusion process to be explained below, it is assumed that each pixel corresponds to density data formed from the components of yellow (Y), magenta (M), cyan (C) and black (K), and multivalued image data structured with 8-bit data (256-gradation expression) is used for each component. In order to simplify the explanation, an execution of the error diffusion process will be explained by using such an error diffusion method, by which it is controlled that ink of two colors or more are not be overlapped each other.

Initially, the error diffusion method, which controls that the ink of two colors or more are not be overlapped each other, will be explained. In this case, it will be explained under the condition that image data is expressed by multivalued data structured with 8-bit data (gradation value corresponds to 0 to 255) for each pixel and each density component (Y, M, C and K), and an output is performed by binary data.

If density values of the C and M components of an objective pixel in a multivalued color image respectively correspond to $C_t$ and $M_t$, and if density values of the C and M components of an original image respectively correspond to C and M, the following expressions are given.

$$C_t = C + C_{err}$$

$$M_t = M + M_{err}$$

Here, it should be noted that the $C_{err}$ and $M_{err}$ indicate the values which are obtained by executing the error diffusion process to the objective pixel for each of the C and M components.

Figure 16:
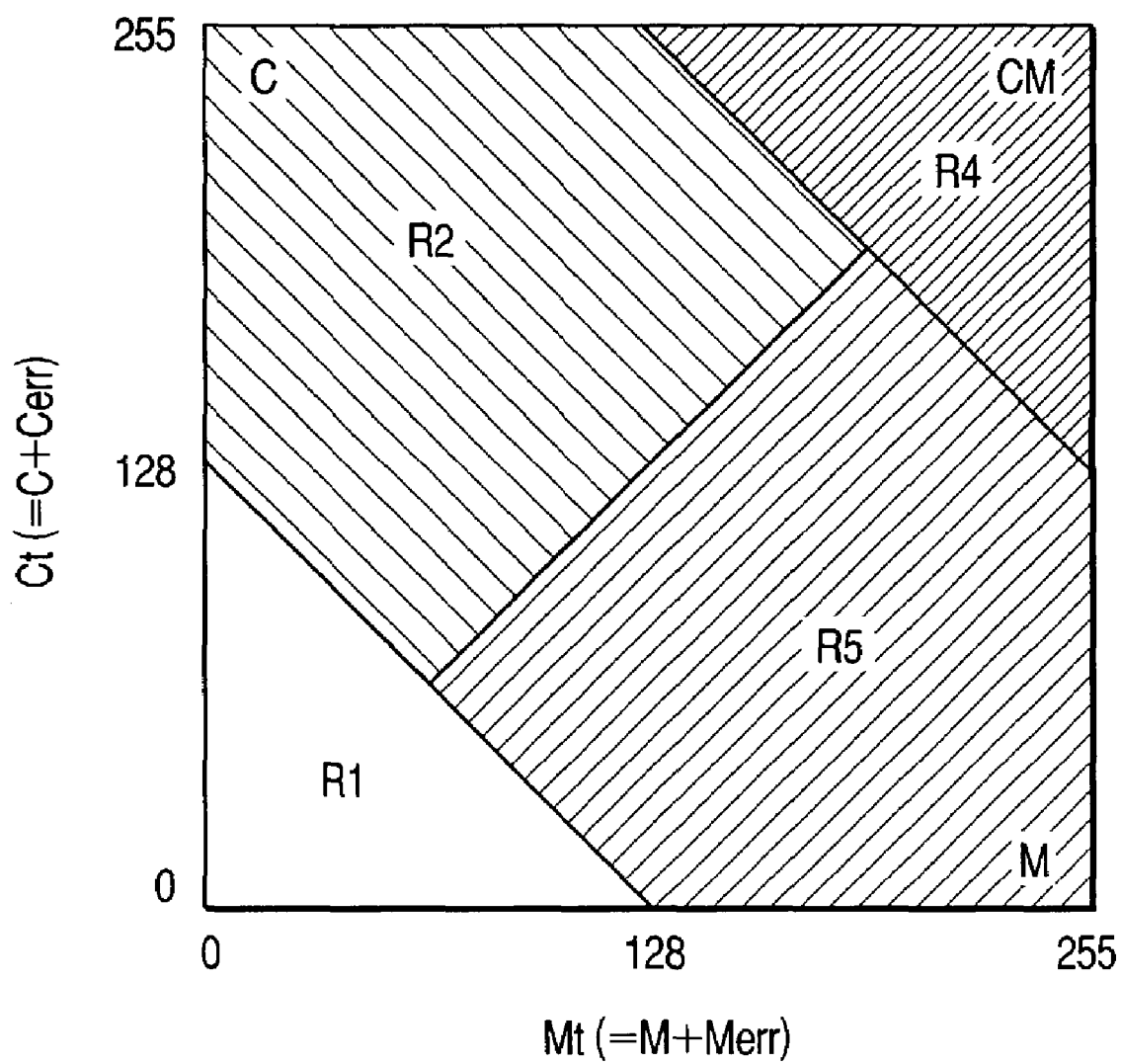
FIG. 16 is a view showing an image formation control according to a conventional ink-jet system.
Figure 17A:
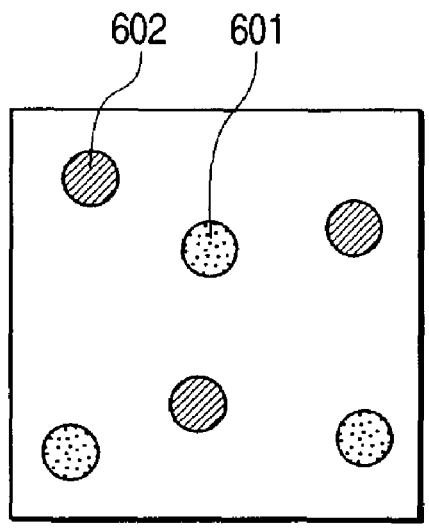
FIGS. 17A and 17B are views showing output images in a highlight portion to be used to explain a conventional problem to be solved.
Figure 17B:
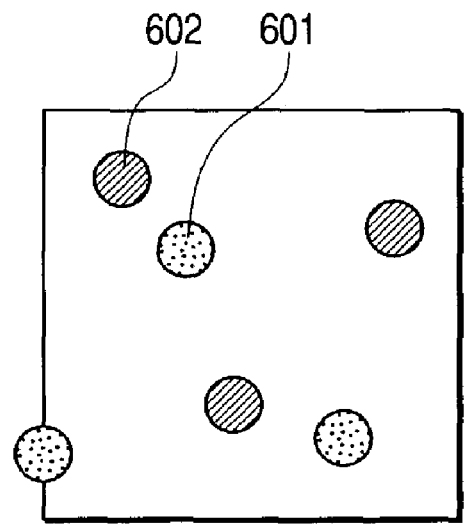
Figure 18A:
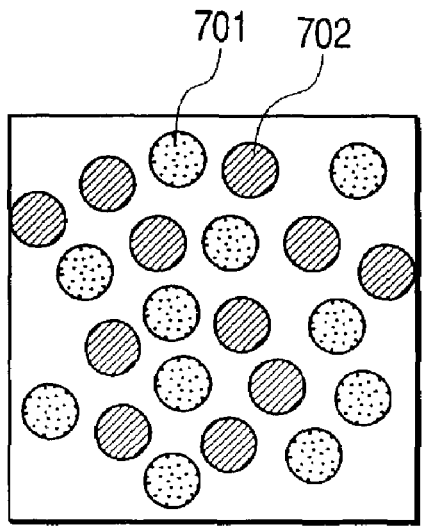
FIGS. 18A and 18B are views showing output images in a halftone portion to be used to explain a conventional problem to be solved.
Figure 18B:
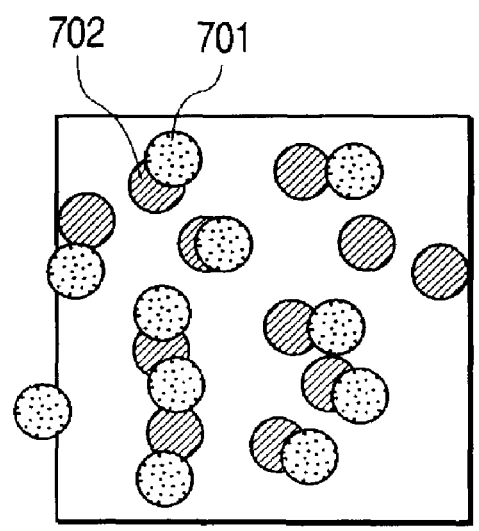

As shown in FIG. 16, with respect to an image formation of the density values C and M, an image formation control is performed by the following procedure in accordance with the density of the C and M components of the objective pixel.

Initially, a threshold $C_{threshold}$ to be used in performing the error diffusion of the C component is obtained on the basis of the density value $M_t$ of the M component. Then, the density value $C_t$ of the C component is compared with the threshold $C_{threshold}$, and when the density value $C_t$ is larger than the threshold $C_{threshold}$, an output is performed by the cyan ink.

Next, a threshold $M_{threshold}$ to be used in performing the error diffusion of the M component is obtained on the basis of the density value $C_t$ of the C component. Then, the density value $M_t$ of the M component is compared with the threshold $M_{threshold}$, and when the density value $M_t$ is larger than the threshold $M_{threshold}$, an output is performed by the magenta ink.

However, even in the above method, when quantizing gradation values of the C and M increase, such a tendency as the process becomes more complex occurs similar to a case of the problem in a conventional example. More specifically, in case of performing an output by binary data, one threshold table is referred, and in case of performing an output by ternary data, two threshold tables are referred. Like this case, in case of performing an output by the n-valued data, since (n−1) threshold tables are required, the number of tables to be prepared increases for a multivalued process of the more increased number of gradations.

Since the density values are repeatedly compared with the thresholds by the number of times corresponding to the number of the threshold tables, the threshold tables stored in a memory have to be referred every time. As a result, the processing speed is inevitably decreased. More specifically, in case of performing an output by the five-valued data, the four threshold tables are required, and a process shown in the following is required.

$$C_t = C + C_{err}$$

$$M_t = M + M_{err}$$

$$C_{out} = 0$$

if$(C_t >$ Threshold_Table1$[M_t])C_{out} = 1$ if$(C_t >$ Threshold_Table2$[M_t])C_{out} = 2$ if$(C_t >$ Threshold_Table3$[M_t])C_{out} = 3$ if$(C_t >$ Threshold_Table4$[M_t])C_{out} = 4$ $$M_{out} = 0$$

if$(M_t >$ Threshold_Table1$[C_t])M_{out} = 1$ if$(M_t >$ Threshold_Table2$[C_t])M_{out} = 2$ if$(M_t >$ Threshold_Table3$[C_t])M_{out} = 3$ if$(M_t >$ Threshold_Table4$[C_t])M_{out} = 4$ Therefore, the above problem is improved by using the following method. In the present embodiment, target data to be processed by the error diffusion method is the multivalued image data of the C and M components. In this embodiment, a case of generating multivalued data equal to or larger than ternary data is treated.

Figure 6:
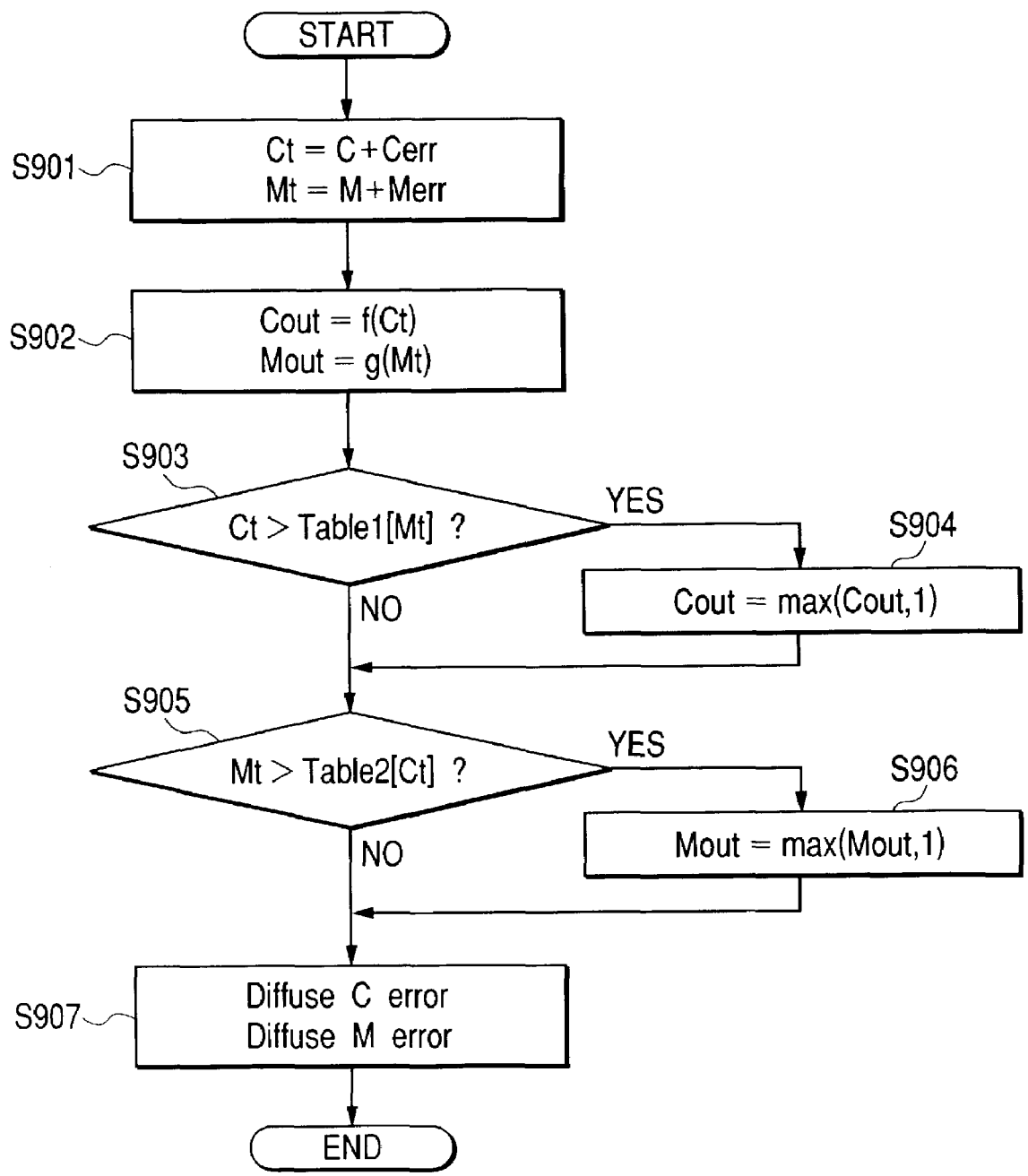
FIG. 6 is a flow chart showing a procedure of an image formation control performed in the information processing apparatus shown in FIG. 1.
Figure 7B:
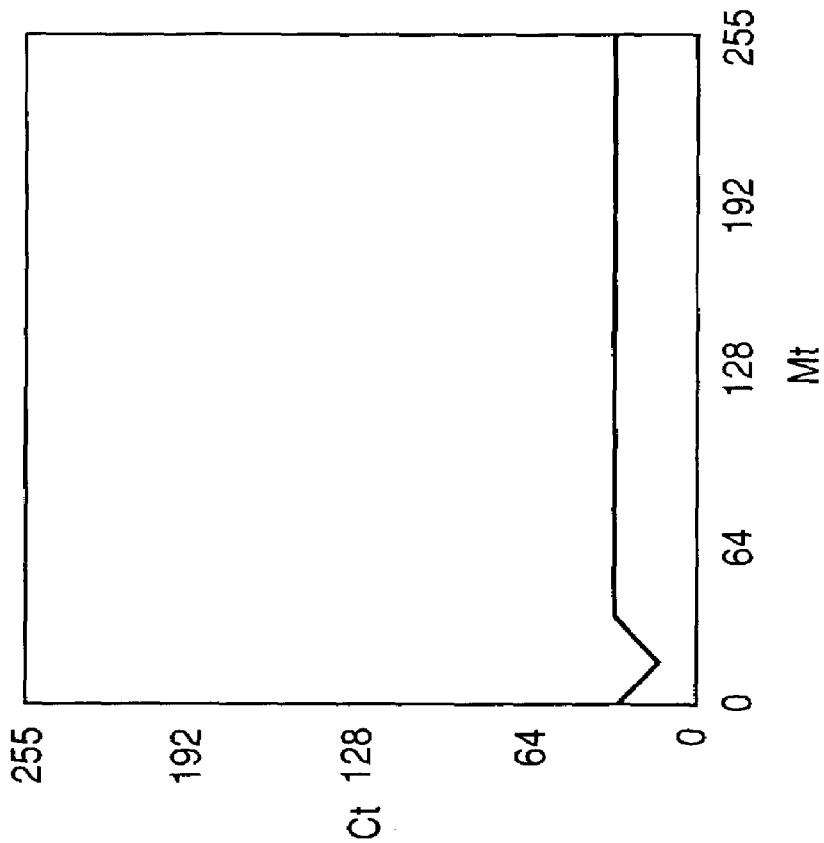
FIGS. 7A and 7B are views respectively showing the condition of thresholds to be used in the image formation control shown in FIG. 6 and an output example.
Figure 7A:
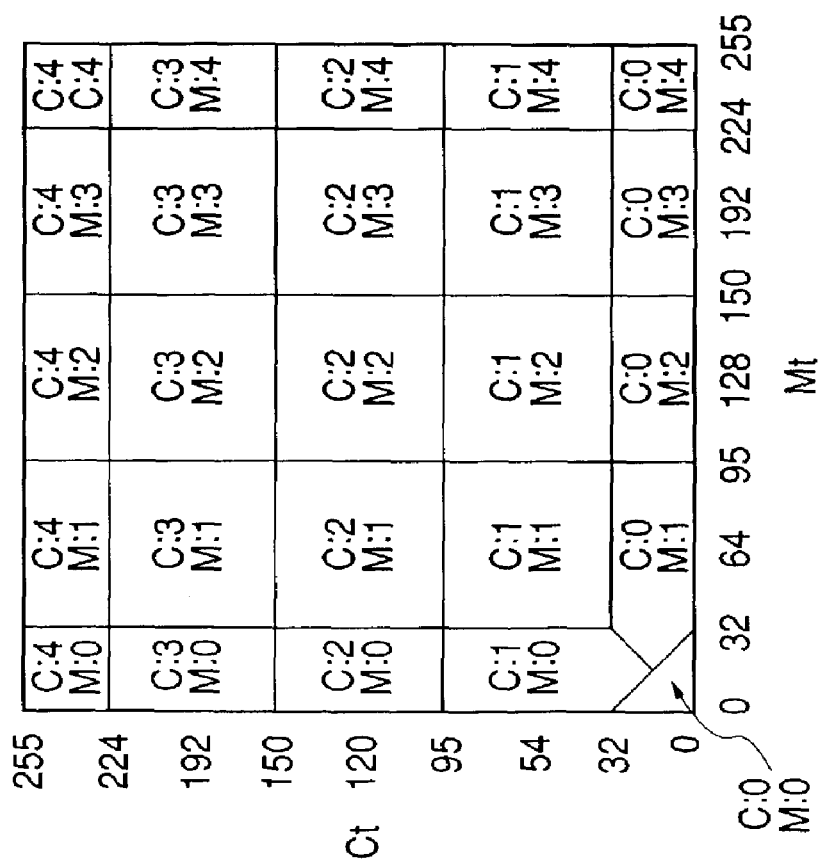
Figure 8B:
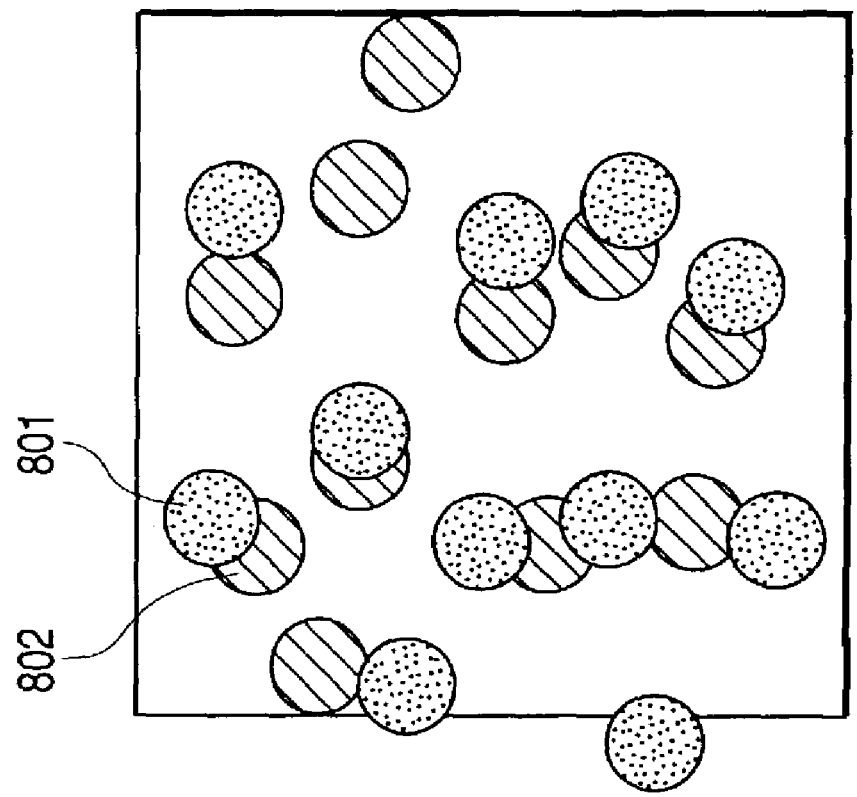
FIGS. 8A and 8B are views showing examples of output images of a halftone portion according to the image formation control shown in FIG. 6.
Figure 8A:
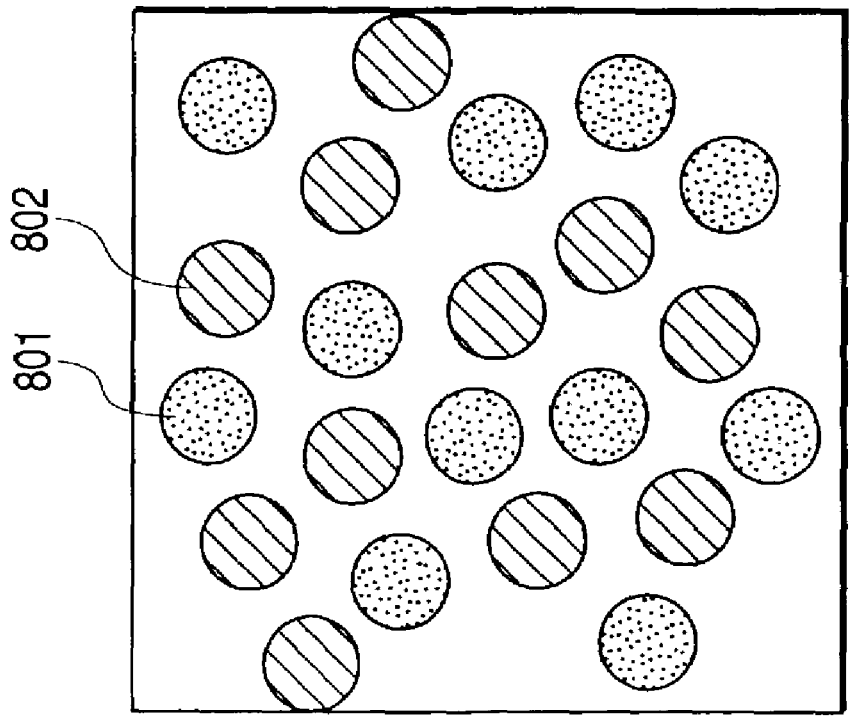

An image formation control in this case will be explained with reference to FIGS. 6 to 8B. FIG. 6 is a flow chart showing a procedure of the image formation control performed in the information processing system shown in FIG. 1. FIGS. 7A and 7B are views respectively showing the condition of thresholds to be used in the image formation control shown in FIG. 6 and an output example. FIGS. 8A and 8B are views showing examples of output images of a halftone portion according to the image formation control shown in FIG. 6.

In the image formation control, as shown in FIG. 6, initially, the summed density values $C_t$ and $M_t$ are obtained based on the input pixel density values C and M and the accumulated error values $C_{err}$ and $M_{err}$ in a step S901. Then, in a step S902, the quantization is performed to the density components C and M. The quantization performed in this embodiment may be based on the conventionally known monochrome error diffusion method. In the present embodiment, an error diffusion method for the cyan is described as f(C) and an error diffusion method for the magenta is described as g(M). However, different error diffusion methods are not always applied to the cyan and magenta but the same method may be used for the cyan and magenta for the simplification.

Next, in a step S903, a threshold Table1[$M_t$] corresponding to the summed density value $M_t$ is read with reference to a threshold table Table1 for the magenta, and the threshold Table1[$M_t$] corresponding to the summed density value $M_t$ is compared with the summed density value $C_t$. When the summed density value $C_t$ is larger than the threshold Table1[$M_t$], the quantization value is set to 1 in a step S904 in case of the quantization value $C_{out}$ obtained in the step S902 is equal to 0. In the present embodiment, as a result of comparing the quantization value $C_{out}$ obtained in the step S902 with a numerical value 1, the larger value is treated as a new quantization value $C_{out}$ for the simplification. Then, a flow advances to a step S905. When the summed density value $C_t$ is not larger than the threshold Table1[$M_t$], the step S904 is skipped and the flow advances to the step S905.

In the step S905, a threshold Table2[$C_t$] corresponding to the summed density value $C_t$ is read with reference to a threshold table Table2, and the threshold Table2[$C_t$] corresponding to the summed density value $C_t$ is compared with the summed density value $M_t$. When the summed density value $M_t$ is larger than the threshold Table2[$C_t$], the quantization value is set to 1 in a step S906 in case of the quantization value $M_{out}$ obtained in the step S902 is equal to 0. In the present embodiment, as a result of comparing the quantization value $M_{out}$ obtained in the step S902 with a numerical value 1, the larger value is treated as a new quantization value $M_{out}$ for the simplification. Then, a flow advances to a step S907. When the summed density value $M_t$ is not larger than the threshold Table2[$C_t$], the step S906 is skipped and the flow advances to the step S907.

In the step S907, an error amount is calculated on the basis of the output quantization values $C_{out}$ and $M_{out}$ fixed in the flow from the step S901 to the step S906, and the errors are diffused to peripheral pixels. Then, the process ends.

In the above image formation control, for example, if the relationship between the input density values of the cyan and magenta and the output values thereof when a generation of the four-valued data is performed is indicated by a graph shown in FIG. 7A, an area under the condition of C<64 and M<64 among two areas of (C: 1, M: 0) and (C: 0, M: 1) corresponds to a part, to which processes in the steps S904 and S906 have been executed. As an example of the threshold table Table1 for the magenta to be used in this case, there is such a table indicated by a graph shown in FIG. 7B.

In the present embodiment, as the threshold tables, the Table1 and the Table2 are respectively used for the magenta and cyan. However, the independent table is not always required but the same table may be used for the simplification. In the practical use, when the same table is used, since possibility of coinciding the value of $C_{out}$ with the value of $M_{out}$ increases under the condition of $C_t$=$M_t$, it is preferable to use tables, of which the contents are partially different, for each of the magenta and cyan. Accordingly, a diffusing effect of the C and M improves, and an improvement of the image quality can be expected. Even in case of using the same table, if the one comparison is assumed as a comparison ($\geqq$) of including an equal sign in the respective comparisons executed in the steps S903 and S905, the same effect can be expected.

In the present embodiment, only the threshold condition at the most highlight side is modulated on the basis of the other color information. Therefore, in the present embodiment, image quality of only the pixels corresponding to the quantized values of 0 and 1 is improved, and the error diffusion is to be independently performed for each color as to a halftone portion. Accordingly, the change of an area factor in the halftone portion can be suppressed by the following reason.

For example, in FIG. 8A, an example of the output result on a printer output sheet obtained by executing an each-color independent error diffusion process in the halftone portion is shown. In FIG. 8A, a dotted circle (dot) 801 represents a cyan ink dot, and a hatched circle (dot) 802 represents a magenta ink dot. FIG. 8B shows an output result on the printer output sheet in a case where dot apply positions are shifted and an entire part of cyan ink dots group shown in FIG. 8A is shifted to the left side with the width almost same as the width of an ink dot diameter. In case of the each-color independent error diffusion process which fundamentally does not have the correlation between the cyan and the magenta, the serious difference does not occur in an area factor in any case of the output results on the printer output sheet shown in FIGS. 8A and 8B.

As above, even in a system where dot apply positions are shifted, image quality of a highlight portion can be improved while decreasing the harmful influence to the image. Further, since the required number of the threshold tables can be set to one while simplifying the process by adopting the threshold table, the compact sized threshold table can be realized.

In a case where the processing speed of an each-color independent quantization process executed in the step S902 is faster than the processing speed of a two-color simultaneous error diffusion process executed in the steps S903 to S906, the processing speed is improved by the corresponded decreased number of times of the two-color simultaneous error diffusion processes.

As above, according to the present embodiment, even in an image processing form having the more increased number of gradations, a high-speed process can be executed with the simple structure, and an error diffusion process of effectively functioning to the shift of dot apply positions can be executed.

Second Embodiment

Figure 9A:
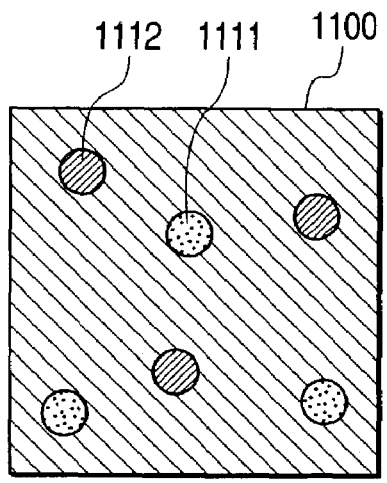
FIGS. 9A and 9B are views showing examples of an output result on a printer output sheet obtained by executing a two-color simultaneous error diffusion process in a dark portion.
Figure 9B:
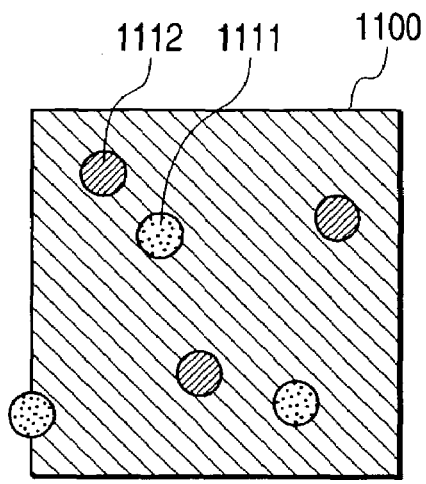
Figure 10A:
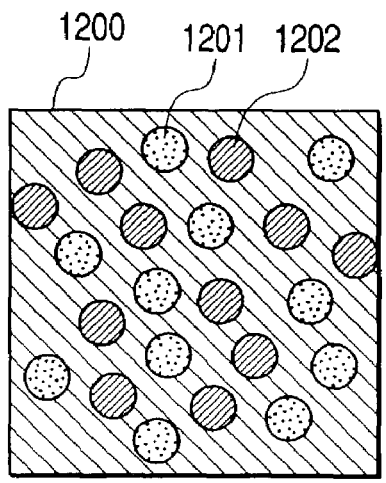
FIGS. 10A and 10B are views showing examples of an output result on the printer output sheet obtained by executing the two-color simultaneous error diffusion process in a halftone portion inclined to the dark.
Figure 10B:
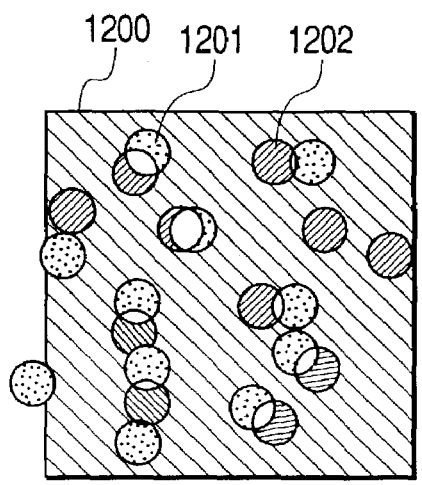
Figure 11:
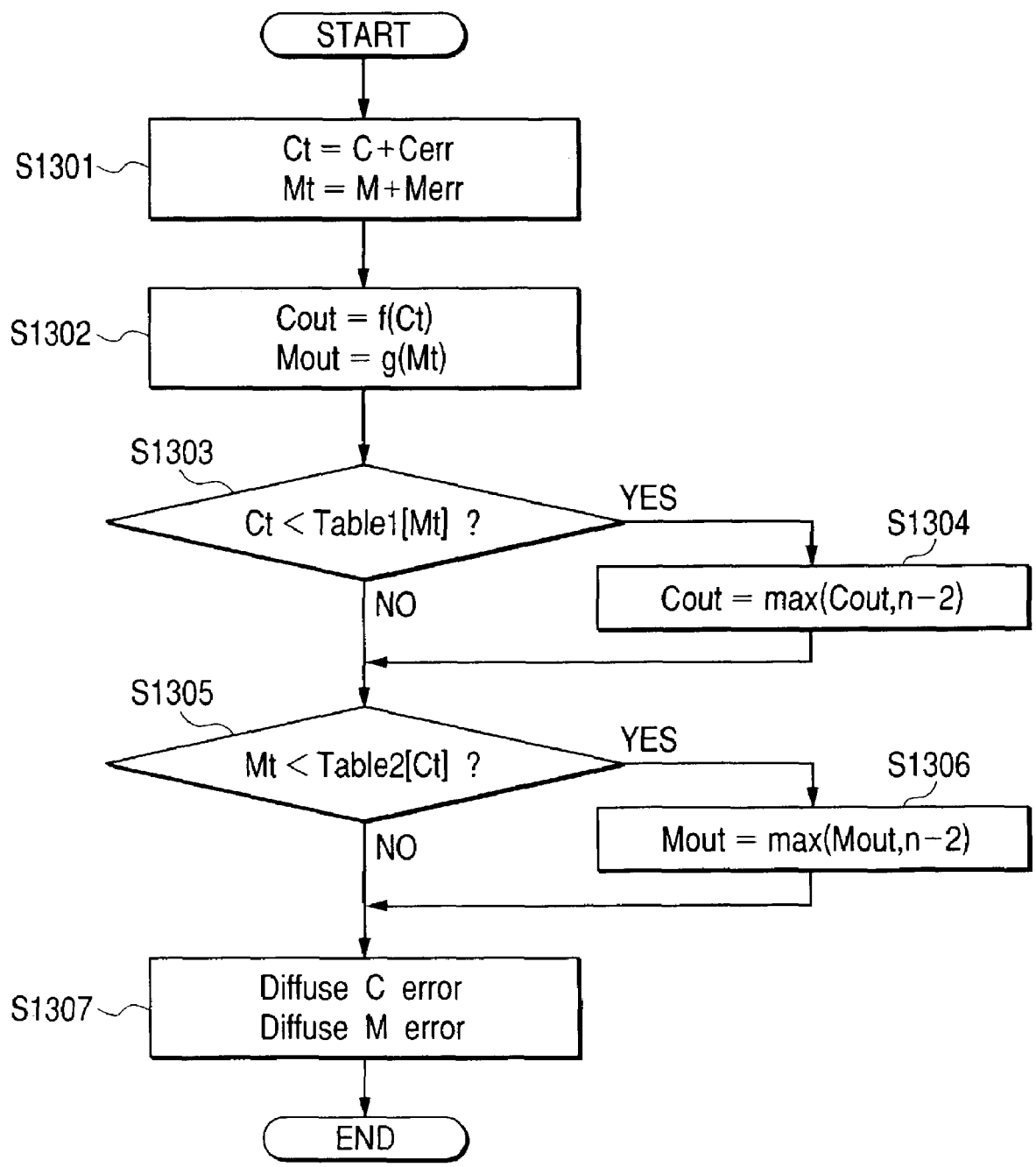
FIG. 11 is a flow chart showing a procedure of an image formation control according to the second embodiment of the present invention.
Figure 12B:
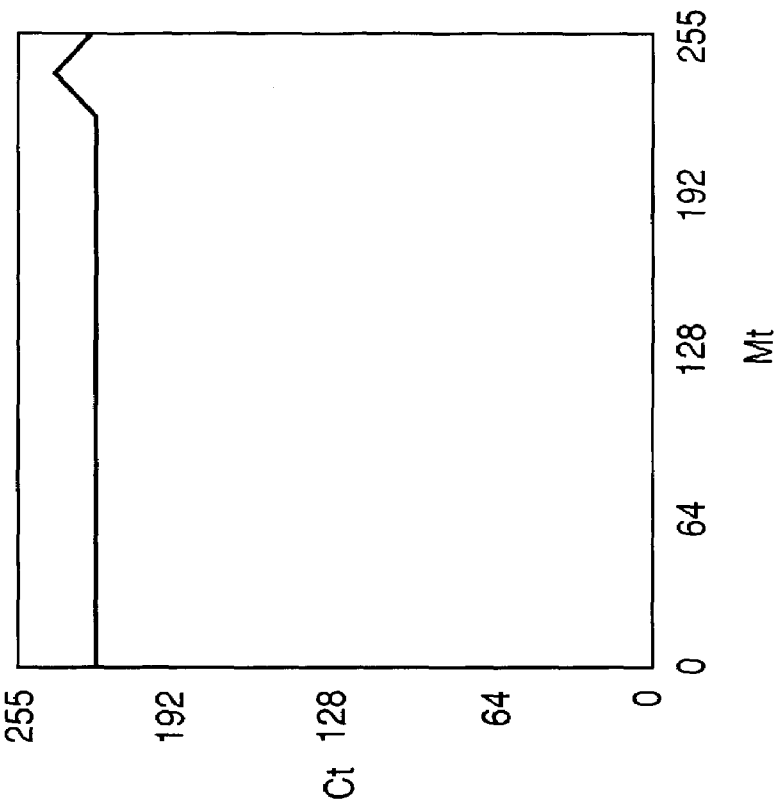
FIGS. 12A and 12B are views respectively showing the condition of thresholds to be used in the image formation control shown in FIG. 11 and an output example.
Figure 12A:
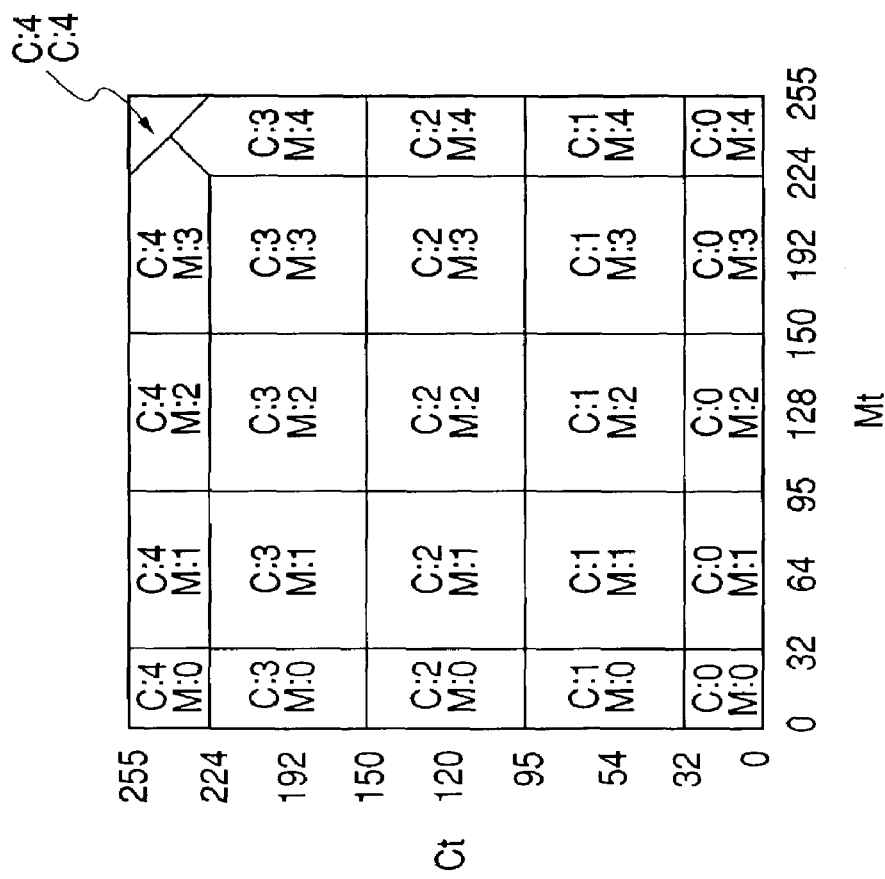

Next, the second embodiment of the present invention will be explained with reference to FIGS. 9A to 12B. FIGS. 9A and 9B are views respectively showing examples of an output result on a printer output sheet obtained by executing a two-color simultaneous error diffusion process in a dark portion. FIGS. 10A and 10B are views respectively showing examples of an output result on the printer output sheet obtained by executing the two-color simultaneous error diffusion process in a halftone portion inclined to the dark. FIG. 11 is a flow chart showing a procedure of an image formation control according to the second embodiment of the present invention. FIGS. 12A and 12B are views respectively showing the condition of thresholds to be used in the image formation control shown in FIG. 11 and an output example. In the present embodiment, the explanation of the same structures as those in the first embodiment will be omitted.

In the first embodiment, the two-color simultaneous error diffusion process is assigned to only the highlight portion. However, in the present embodiment, a practical application example as to the higher-density portion will be explained.

In case of further reducing the change of an area factor, it is required to consider as to not only the highlight portion but also a highest density portion.

For example, as an output result on the printer output sheet obtained by executing the two-color simultaneous error diffusion process in the dark portion, a case that a blue area 1100 as shown in FIG. 9A is formed on the sheet by both of the cyan and magenta is considered. In FIG. 9A, a dotted circle (dot) 1111 represents a portion where the magenta ink is not recorded, and a hatched circle (dot) 1112 represents a portion where the cyan ink is not recorded. In the output result shown in FIG. 9A, since the area 1100 on the sheet is almost uniformly coated by the blue and portions 1111 and 1112 where the magenta ink and the cyan ink are not respectively recorded are also uniformly diffused, the image can be treated as an excellent image. On the other hand, the output result on the printer output sheet shown in FIG. 9B indicates that an entire part of ink dots group, where the magenta ink is not recorded, is shifted to the left side with the width almost same as the width of an ink dot diameter in the output result shown in FIG. 9A. Even if some disposition difference is recognized on the sheet, since the portion 1112 where the cyan ink is not recorded and the portion 1111 where the magenta ink is not recorded are not yet overlapped each other, the area factor being a coating ratio of the ink on the sheet does not change.

Next, an example of an output result on the printer output sheet obtained by executing the two-color simultaneous error diffusion process in a halftone portion inclined to the dark is shown in FIG. 10A. In this example, a blue area 1200 is formed on the sheet by both of the cyan and magenta. In FIG. 10A, a dotted circle (dot) 1201 represents a portion where the magenta ink is not recorded, and a hatched circle (dot) 1202 represents a portion where the cyan ink is not recorded. In this example, since the sheet is almost uniformly coated by the blue and the portions 1201 and 1202 where the magenta ink and the cyan ink are not respectively recorded are also uniformly diffused, the image can be treated as an excellent image. On the other hand, the output result shown in FIG. 10B indicates that an entire part of ink dots group, where the magenta ink is not recorded, is shifted to the left side with the width almost same as the width of an ink dot diameter against the output result shown in FIG. 10A. In an example shown in FIG. 10B, the shift in this case is different from the shift from the case in FIG. 9A to the case in FIG. 9B. That is, the portion 1202 where the cyan ink is not recorded is overlapped with the portion 1201 where the magenta ink is not recorded with the high probability. In this case, the overlapped portion is not recorded by both of the cyan ink and magenta ink, and the area factor being the coating ratio of the ink on the sheet considerably changes.

Therefore, the present embodiment realizes a high-speed process with the simple structure similar to a case in the first embodiment and further executes such an error diffusion process so as to realize a state that the change of the area factor in the dark portion is reduced and the change of the area factor in the halftone portion inclined to the dark is also reduced.

Next, the image formation control in the present embodiment will be explained with reference to FIG. 11.

In the image formation control of the present embodiment, as shown in FIG. 11, initially, the summed density values $C_t$ and $M_t$ is obtained based on the input pixel density values C and M and the accumulated error values $C_{err}$ and $M_{err}$ in a step S1301. Then, a quantization based on the summed density values $C_t$ and $M_t$ is performed in a step S1302. The quantization performed in this embodiment may be based on the conventionally known monochrome error diffusion method similar to a case in the first embodiment, and an error diffusion method for the cyan is represented as $f(C_t)$ and an error diffusion method for the magenta is represented as $g(M_t)$. Then, different error diffusion methods are not always applied to the cyan and magenta, but the same method may be used for the cyan and magenta for the simplification.

Subsequently, in a step S1303, a threshold Table1[$M_t$] corresponding to the summed density value $M_t$ is read from a threshold table Table1, and the threshold Table1[$M_t$] corresponding to the summed density value $M_t$ is compared with the summed density value $C_t$. When the summed density value $C_t$ is smaller than the threshold Table1[$M_t$], a quantization value is set to "n−2" being the second largest value in a step S1304 in case of a quantization value $C_{out}$ obtained in the step S1302 corresponds to "n−1" being the maximum value in a quantization of generating n-valued data. In the present embodiment, as a result of comparing the quantization value $C_{out}$ obtained in the step S1302 with a numerical value "n−2", the smaller value is treated as a new quantization value $C_{out}$ for the simplification. Then, a flow advances to a step S1305. On the other hand, when the summed density value $C_t$ is not smaller than the threshold Table1[$M_t$] in the step S1303, the step S1304 is skipped and the flow advances to the step S1305.

In the step S1305, a threshold Table2[$C_t$] corresponding to the summed density value $C_t$ is read from a threshold table Table2, and the threshold Table2[$C_t$] corresponding to the summed density value $C_t$ is compared with the summed density value $M_t$. When the summed density value $M_t$ is smaller than the threshold Table2[$C_t$], the quantization value is set to "n−2" being the second largest value in a step S1306 in case of a quantization value $M_{out}$ obtained in the step S1302 corresponds to "n−1" being the maximum value in the quantization of generating n-valued data. In the present embodiment, as a result of comparing the quantization value $M_{out}$ obtained in the step S1302 with a numerical value "n−2", the smaller value is treated as a new quantization value $M_{out}$ for the simplification. Then, a flow advances to a step S1307. On the other hand, when the summed density value $M_t$ is not smaller than the threshold Table2[$C_t$] in the step S1305, the step S1306 is skipped and the flow advances to the step S1307.

In the step S1307, an error amount is calculated on the basis of the output quantization values $C_{out}$ and $M_{out}$ fixed in the flow from the step S1302 to the step S1306, the errors are diffused to peripheral pixels, and then the process ends.

In the above image formation control, for example, if the relationship between the input density values and the output values of the cyan and magenta when the generation of the four-valued data is performed is expressed by a graph shown in FIG. 12A, an area under the condition of C>192 and M>102 among two areas of (C: 3, M: 2) and (C: 2, M: 3) corresponds to a part, to which processes in the steps S1304 and S1306 have been executed. In this case, as the threshold table Table1, for example, such a table indicated by a graph shown in FIG. 12B is used.

In the present embodiment, as the threshold tables, the Table1 and the Table2 are used for the magenta and cyan. However, the independent table is not always required. For the simplification, the same table may be used. In the practical use, when the same table is used, since possibility of coinciding the value of $C_{out}$ with the value of $M_{out}$ increases under the condition of $C_t=M_t$, it is preferable to use tables, of which the contents are partially different, for each of the magenta and cyan. Accordingly, a diffusing effect of the C and M improves, and an improvement of the image quality can be expected. Even in case of using the same table, if the one comparison is assumed as a comparison (≧)

of including an equal sign in the respective comparisons executed in the steps S1303 and S1305, the same effect can be expected.

As above, according to the present embodiment, a high-speed process can be realized with the simple structure, and the change of an area factor in a dark portion can be reduced and the change of an area factor in a halftone portion inclined to the dark can be reduced.

Third Embodiment

Figure 13B:
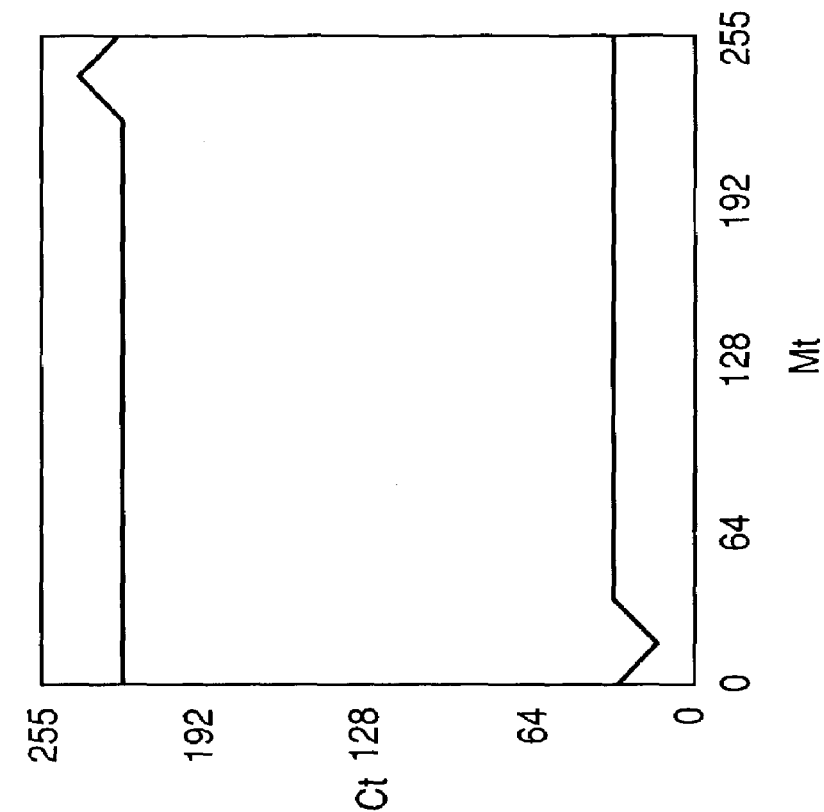
FIGS. 13A and 13B are views respectively showing the condition of thresholds to be used in the image formation control according to the second embodiment of the present invention and output examples.
Figure 13A:
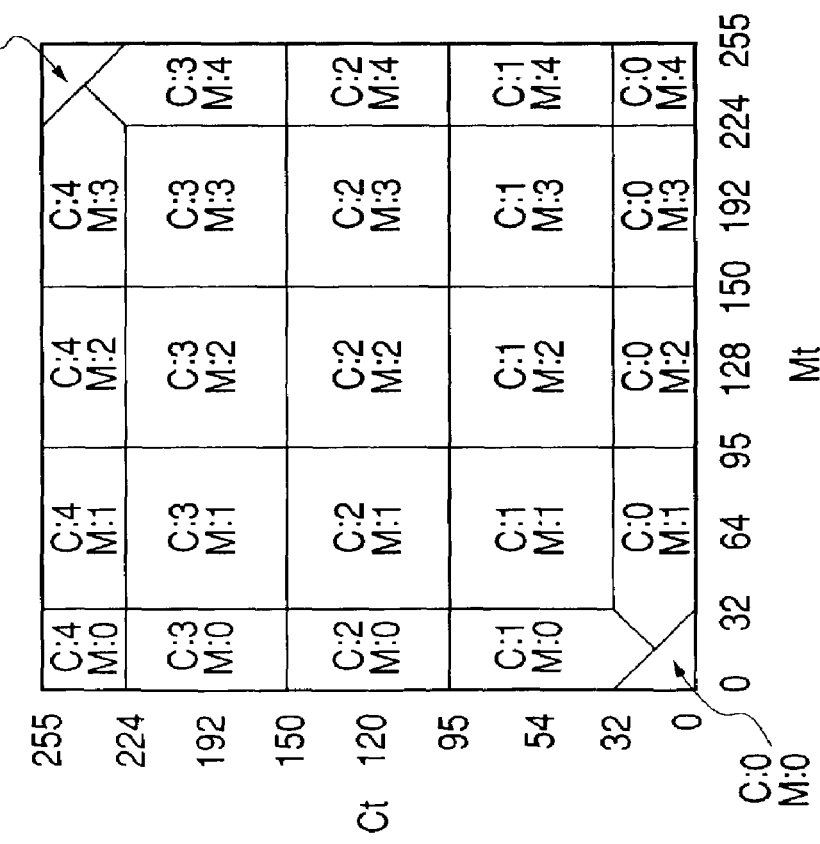

Next, the third embodiment of the present invention will be explained with reference to FIGS. 13A and 13B. FIGS. 13A and 13B are views respectively showing the condition of thresholds to be used in the image formation control according to the second embodiment of the present invention and output examples. In the present embodiment, the explanation of the same structures as those in the first embodiment will be omitted.

In the present embodiment, an image formation control, which combines the two-color simultaneous error diffusion method noticing the highlight portion explained in the first embodiment with the two-color simultaneous error diffusion method noticing the dark portion explained in the second embodiment, is performed. An actual process flow in case of performing this image formation control advances from just before the step S907 in the flow chart shown in FIG. 6 to the step S1303 in the flow chart shown in FIG. 11 and then advances again from just before the step S1307 to the step S907 in the flow chart shown in FIG. 6. It is assumed that a process to be executed in each of steps follows the process in the first and second embodiments.

The relationship between input density values and output values regarding the cyan and magenta in case of generating the four-valued data in the image formation control of the present embodiment is shown in FIG. 13A. As a threshold table Table1, for example, such a table as indicated by a graph shown in FIG. 13B is used. That is, in the present embodiment, at least two threshold tables are used for one color in order to suppress the change of area factors in a highlight portion and a dark portion.

As above, according to the present embodiment, a high-speed process can be realized with the simple structure and an image having good balance in an entire density area can be formed by selectively applying the two-color simultaneous error diffusion process to the highlight portion and the dark portion.

Fourth Embodiment

Figure 14:
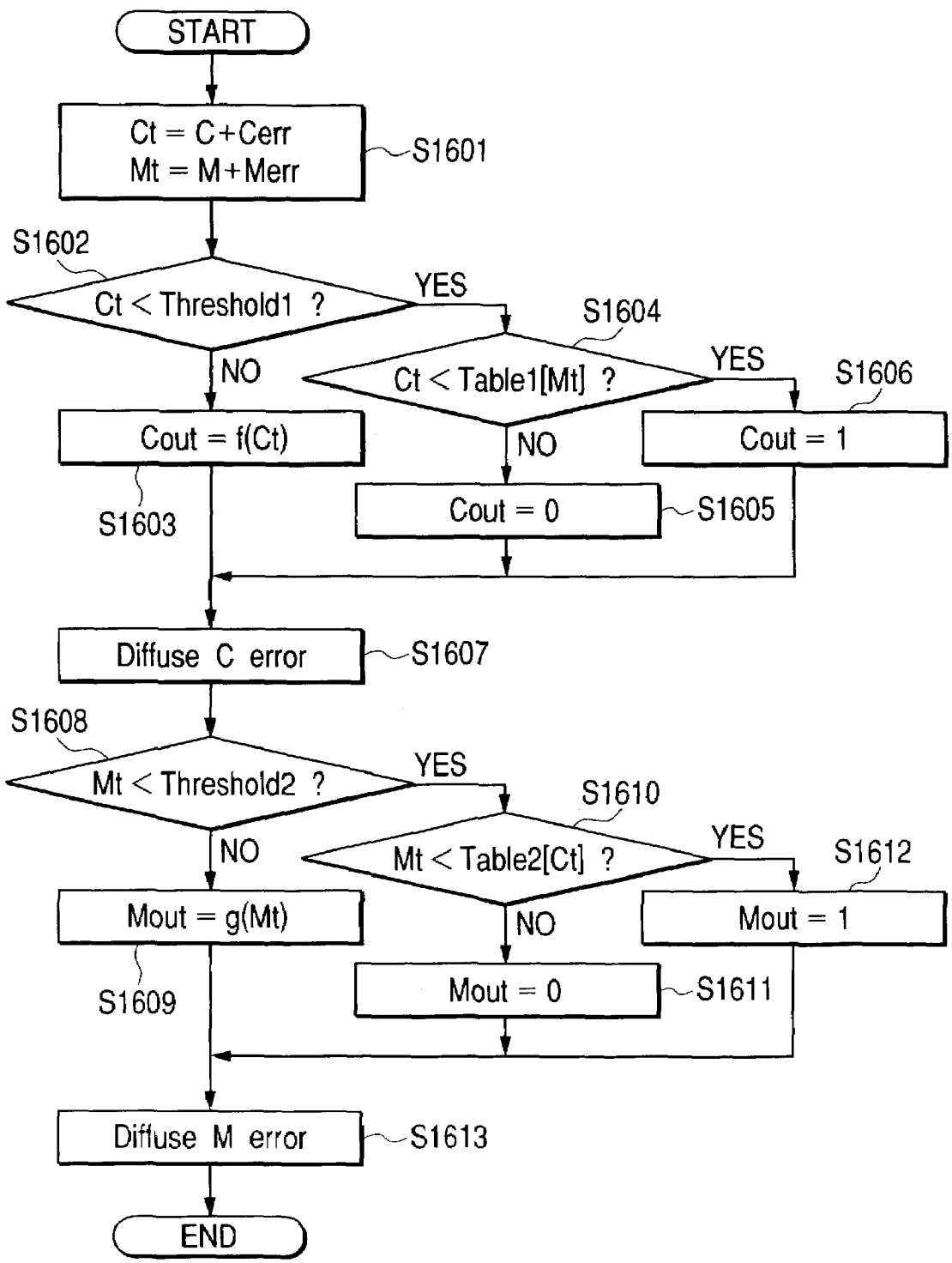
FIG. 14 is a flow chart showing a procedure of an image formation control according to the fourth embodiment of the present invention.
Figure 15:
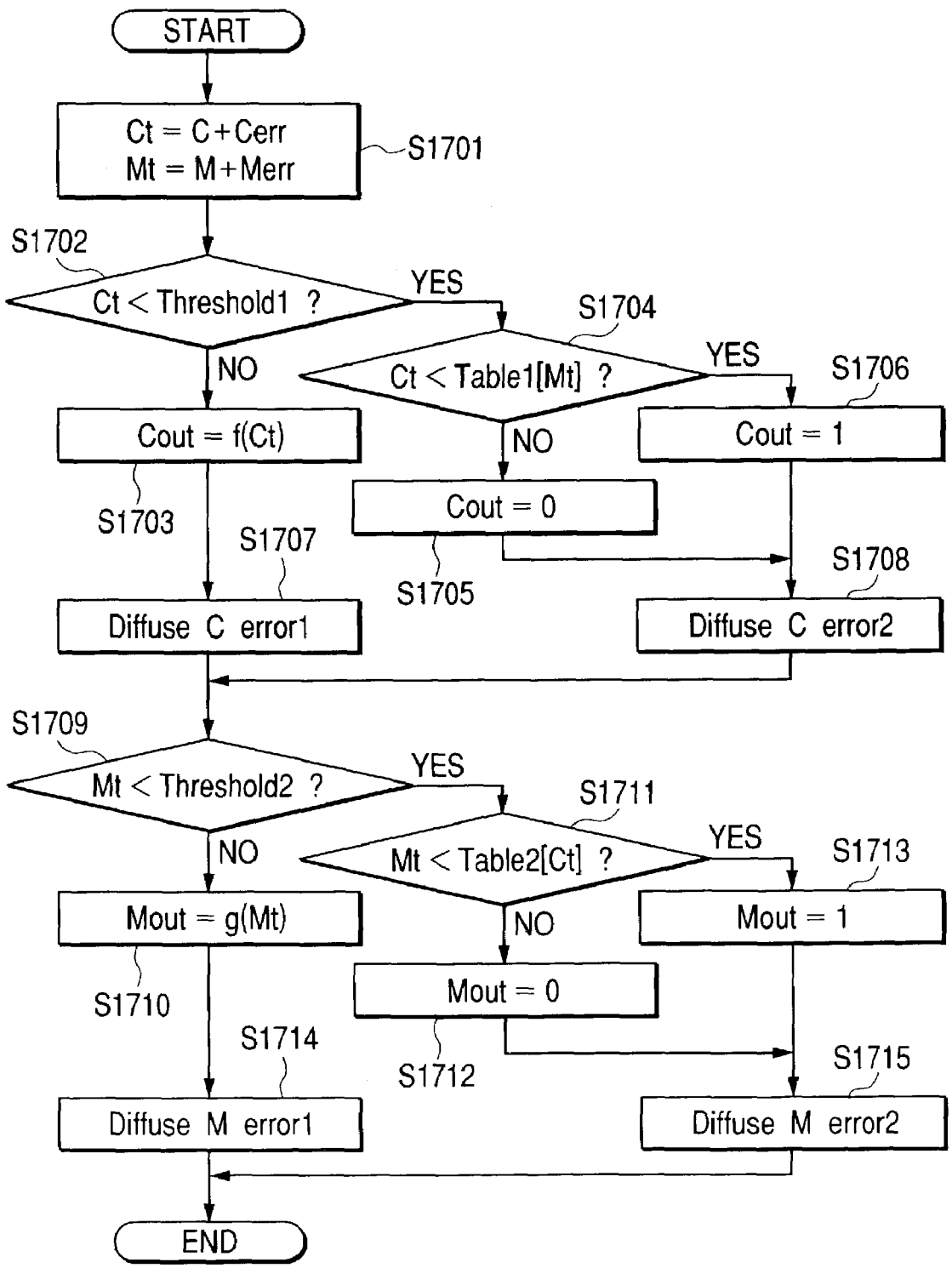
FIG. 15 is a flow chart showing a switching procedure of an error diffusion process including an error diffusion method to be used in the image formation control shown in FIG. 14.

Next, the fourth embodiment of the present invention will be explained with reference to FIGS. 14 and 15. FIG. 14 is a flow chart showing a procedure of an image formation control according to the fourth embodiment of the present invention. FIG. 15 is a flow chart showing a switching procedure of an error diffusion process of including an error diffusion method in the image formation control shown in FIG. 14.

In the first, second and the third embodiments, a final quantization value is determined on the basis of the comparison between the value of quantized result and the threshold. However, the final quantization value is not always judged from the compared result of both values. Therefore, in the present embodiment, it is determined that which the error diffusion method is to be used in accordance with a summed density value.

More specifically, the image formation control in the present embodiment is performed in accordance with the flow chart shown in FIG. 14. If this flow chart is expressed by program codes, the following codes are given. The step number in FIG. 14 corresponding to each code is additionally written in the right side.

```
C_t = C + C_err                          (S1601)
M_t = M + M_err                          (S1601)
if (C_t > threshold1)                    (S1602)
    C_out = f (C_t)                      (S1603)
else
    if (C_t > Threshold_table [M_t])     (S1604)
        C_out = 1                        (S1606)
    else
        C_out = 0                        (S1605)
Diffuse C Error                          (S1607)
if (M_t > threshold2)                    (S1608)
    M_out = g (M_t)                      (S1609)
else
    if (M_t > Threshold_table [C_t])     (S1610)
        M_out = 1                        (S1612)
    else
        M_out = 0                        (S1611)
Diffuse M Error                          (S1613)
```

As described below, it may be determined that which the method is to be used in accordance with the input density value.

```
C_t = C + C_err
M_t = M + M_err
if (C < threshold1)
    C_out = f (C_t)
else
    if (C_t > Threshold_table [M_t])
        C_out = 1
    else
        C_out = 0
if (M < threshold2)
    M_out = f (M_t)
else
    if (M_t > Threshold_table [Ct])
        M_out = 1
    else
        M_out = 0
Diffuse C Error
```

Diffuse M Error

If further describing, it is not limited to a case of selectively using only the quantization part but a case of switching an error diffusion processing method every pixel including error diffusion parts is available. By this manner, the same effect can be expected and further a preferable error diffusion method can be adopted for each of the error diffusion methods.

A processing procedure in this case is indicated by a flow chart shown in FIG. 15. If this flow chart is expressed by program codes, the following codes are given. The step number in FIG. 15 corresponding to each code is additionally written in the right side.

```
C_t = C + C_err                          (S1701)
M_t = M + M_err                          (S1701)
if (C_t < threshold1)                    (S1702)
    C_out = f (C_t)                      (S1703)
    Diffuse C Error1                     (S1705)
```

-continued

```
else
        if (C_t > Threshold_table [M_t])    (S1704)
                C_out = 1                   (S1706)
        else
                C_out = 0                   (S1707)
        Diffuse C Error2                    (S1708)
if (M_t < threshold2)                       (S1709)
        M_out = g (M_t)                     (S1710)
        Diffuse M Error1                    (S1714)
else
        if (M_t > Threshold_table [C_t])    (S1711)
                M_out = 1                   (S1713)
        else
                M_out = 0                   (S1712)
        Diffuse M Error2                    (S1715)
```

Here, the Diffuse C Error1 indicates an error diffusion means corresponding to the quantization of $C_{out}=f(C_t)$ and the Diffuse C Error2 indicates an error diffusion means corresponding to a two-color simultaneous error diffusion. Similarly, the Diffuse M Error1 indicates an error diffusion means corresponding to the quantization of $M_{out}=g(M_t)$ and the Diffuse M Error2 indicates an error diffusion means corresponding to the two-color simultaneous error diffusion.

Fifth Embodiment

Next, the fifth embodiment of the present invention will be explained.

In the first embodiment, a simple error diffusion method has been explained. However, in the present embodiment, an example of applying the first embodiment to a conventional example will be explained.

```
C_t = C + C_err
M_t = M + M_err
C_out = 0
M_out = 0
if (C_t + M_t > Threshold1)
        if (C_t + M_t < Threshold1)
                if (C_t > M_t)
                        C_out = 1
                else
                        M_out = 1
        else
                C_out = f (C_t)
                M_out = g (M_t)
```

As above, a process can be exceedingly simplified. The above $f(C_t)$ and $g(M_t)$ are same as those in the first embodiment. Similarly, the second and third embodiments can be also applied to the conventional example.

Sixth Embodiment

Next, the sixth embodiment of the present invention will be explained.

In the above first to fifth embodiments, only the two colors of cyan and magenta are used. However, in the present embodiment, more various density values are treated. More specifically, a multivalued error diffusion process of reducing the overlap of dots ink, such as the large droplet dark ink, the large droplet light ink, the small droplet dark ink and the small droplet light ink of cyan and the large droplet dark ink, the large droplet light ink, the small droplet dark ink and the small droplet light ink of magenta, is executed.

That is, a procedure of $ms_{out}=\max(1, ms_{out})$ is taken.

According to the above method, the overlap portions among ink groups, where the different colorant density of plural colors and the different ink discharge amount are observed, can be reduced. Furthermore, a high-speed process can be executed for the quantization of the more increased number of gradations.

Seventh Embodiment

Next, as to the seventh embodiment, an error diffusion process to be executed by the halftone processing module 34 will be explained in detail. In this error diffusion process, it is assumed that each pixel corresponds to density data formed from the components of yellow (Y), magenta (M), cyan (C) and black (K), and each component is used as multivalued image data structured with 8-bit data (256-gradation expression).

In the seventh embodiment, an image processing method of simply processing a complex threshold control by using threshold tables will be shown. The threshold table corresponds to such data in which thresholds necessary for determining each gradation are set. In this embodiment, with respect to color image data, each pixel and each density component (Y, M, C and K) are expressed by multivalued data of 8-bit data (0 to 255 gradations).

If density values of the C and M components of an original image are respectively denoted by C and M, a density value $C_t$ of the C component and a density value $M_t$ of the M component of an arbitrary objective pixel in the color image data are expressed by the following expressions. Here, $C_{err}$ and $M_{err}$ indicate error diffused values respectively diffused to objective pixels of the C and M components.

$$C_t = C + C_{err}$$

$$M_t = M + M_{err}$$

In an image processing method of a color image in the seventh embodiment, an image process is executed by the following procedure by using each density value of the C and M components of the objective pixel.

1. A threshold ($C_{threshold}$) used in executing an error diffusion process of the C component is obtained on the basis of the density value $M_t$ of the M component.
2. The density value $C_t$ of the C component is compared with the threshold ($C_{threshold}$), and when the density value $C_t$ is larger, an output is performed by the C ink.
3. A threshold ($M_{threshold}$) used in executing an error diffusion process of the M component is obtained on the basis of the density value $C_t$ of the C component.
4. The density value $M_t$ of the M component is compared with the threshold ($M_{threshold}$), and when the density value $M_t$ is larger, an output is performed by the M ink.

Algorithm in case of quantizing the cyan and magenta in ternary by the above method is indicated by the following expressions. According to this method, the process can be simplified as compared with the process in a conventional example.

$$C_t = C + C_{err}$$

$$M_t = M + M_{err}$$

$$C_{out} = 0$$

if$(C_t >$Threshold_Table1$[M_t])C_{out}=1$ if$(C_t >$Threshold_Table2$[M_t])C_{out}=2$ Hereinafter, a symbol Cl denotes a density value of the cyan large droplet dark ink, a symbol Cs denotes a density value of the cyan small droplet dark ink, a symbol cl denotes a density value of the cyan large droplet light ink, a symbol cs denotes a density value of the cyan small droplet light ink, a symbol Ml denotes a density value of the magenta large droplet dark ink, a symbol Ms denotes a density value of the magenta small droplet dark ink, a symbol ml denotes a density value of the magenta large droplet light ink and a symbol ms denotes a density value of the magenta small droplet light ink. An accumulated error of each density value is indicated by adding "$_{err}$" to the word-final position.

In the present embodiment, the following expressions are given.

$$Cl_t = Cl + Cl_{err}$$

$$Cs_t = Cs + Cs_{err}$$

$$cl_t = cl + cl_{err}$$

$$cs_t = cs + cs_{err}$$

$$Ml_t = Ml + Ml_{err}$$

$$Ms_t = Ms + Ms_{err}$$

$$ml_t = ml + ml_{err}$$

$$ms_t = ms + ms_{err}$$

$$Cl_{out} = d(Cl_t)$$

$$Cs_{out} = e(Cs_t)$$

$$cl_{out} = f(cl_t)$$

$$cs_{out} = g(cs_t)$$

$$Ml_{out} = h(Ml_t)$$

$$Ms_{out} = i(Ms_t)$$

$$ml_{out} = j(ml_t)$$

$$ms_{out} = k(ms_t)$$

if$(Cl_t>$Threshold_Table$[Cs_t+cl_t+cs_t+Ml_t+Ms_t+ml_t+ms_t])Cl_{out}=max(1, Cl_{out})$ if$(Cs_t>$Threshold_Table$[Cl_t+cl_t+cs_t+Ml_t+Ms_t+ml_t+ms_t])Cs_{out}=max(1, Cs_{out})$ if$(cl_t>$Threshold_Table$[Cl_t+Cs_t+cs_t+Ml_t+Ms_t+ml_t+ms_t])cl_{out}=max(1, cl_{out})$ if$(cs_t>$Threshold_Table$[Cl_t+Cs_t+cl_t+Ml_t+Ms_t+Ml_t+ms_t])cs_{out}=max(1, cs_{out})$ if$(Ml_t>$Threshold_Table$[Cl_t+Cs_t+cl_t+cs_t+Ms_t+ml_t+ms_t])Ml_{out}=max(1, Ml_{out})$ if$(Ms_t>$Threshold_Table$[Cl_t+Cs_t+cl_t+cs_t+Ml_t+ml_t+ms_t])Ms_{out}=max(1, Ms_{out})$ if$(ml_t>$Threshold_Table$[Cl_t+Cs_t+cl_t+cs_t+Ml_t+Ms_t+ms_t])ml_{out}=max(1, ml_{out})$ if$(ms_t>$Threshold_Table$[Cl_t+Cs_t+cl_t+cs_t+Ml_t+Ms_t+ml_t])ms_{out}=max(1, ms_{out})$ (Threshold_Table1[$M_t$]: first threshold table of density value $M_t$ of M component Threshold_Table2[$M_t$]: second threshold table of density value $M_t$ of M component)

$$M_{out}=0$$

if$(M_t>$Threshold_Table1$[C_t])M_{out}=1$ if$(M_t>$Threshold_Table2$[C_t])M_{out}=2$ (Threshold_Table1[$C_t$]: first threshold table of density value $C_t$ of C component Threshold_Table2[$C_t$]: second threshold table of density value $C_t$ of C component)

However, in this algorithm, when the C and M components are output with the binary data, one threshold table is referred, and when the C and M components are output with the ternary data, two threshold tables are referred. Like this, since the (n−1) tables are required when the C and M components are output with the n-valued data, the number of tables to be prepared for a multivalued process of the more increased number of gradations are increased.

Since the thresholds are repeatedly compared with the density values by the number of times corresponding to the number of the threshold tables, the threshold tables stored in a memory have to be referred every time. As a result, the processing speed is inevitably decreased. Especially, in case of performing an output with the five-valued data, four threshold tables are required, and the following algorithm is required.

$$C_t = C + C_{err}$$

$$M_t = M + M_{err}$$

$$C_{out} = 0$$

if$(C_t>$Threshold_Table1$[M_t])C_{out}=1$ if$(C_t>$Threshold_Table2$[M_t])C_{out}=2$ if$(C_t>$Threshold_Table3$[M_t])C_{out}=3$ if$(C_t>$Threshold_Table4$[M_t])C_{out}=4$ (Threshold Table3[$M_t$]: third threshold table of density value $M_t$ of M component Threshold_Table4[$M_t$]: fourth threshold table of density value $M_t$ of M component)

$$M_{out}=0$$

if$(M_t>$Threshold_Table1$[C_t])M_{out}=1$ if$(M_t>$Threshold_Table2$[C_t])M_{out}=2$ if$(M_t>$Threshold_Table3$[C_t])M_{out}=3$ if$(M_t>$Threshold_Table4$[C_t])M_{out}=4$ (Threshold_Table3[$C_t$]: third threshold table of density value $C_t$ of C component Threshold_Table4[$C_t$]: fourth threshold table of density value $C_t$ of C component)

Next, an image processing method, which can execute a high-speed process even in an image processing form having the more increased number of gradations and can realize the compact sized table information to be held, will be shown.

Target data, to which the error diffusion process is to be executed in the seventh embodiment, is multivalued image data of the C and M components, and a case of generating multivalued data equal to or larger than ternary data by the error diffusion method is treated.

Figure 19:
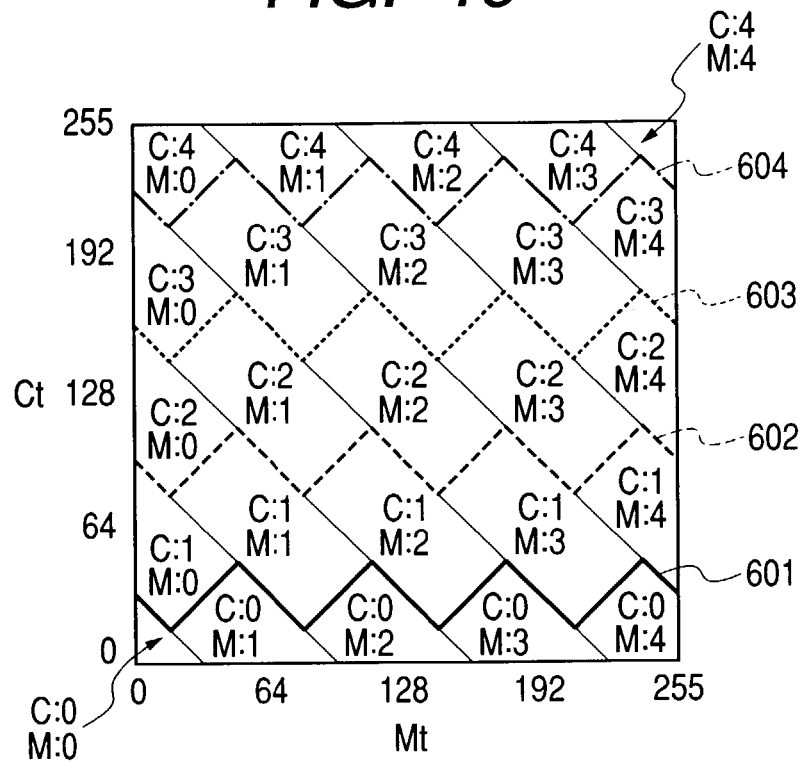
FIG. 19 is a view showing an example of the relationship between quantization thresholds and output quantization values of the cyan based on a magenta density value in the seventh embodiment of the present invention.

FIG. 19 is a view showing an example of the relationship between quantization thresholds and output quantization values of the cyan based on a magenta density value in the seventh embodiment of the present invention.

In FIG. 19, a thick line 601, a dot line 602, a broken line 603 and a one-dot broken line 604 indicate quantization thresholds of the cyan based on the magenta density value $M_t$ in case of executing an error diffusion process in five-valued data by combining the two or more colors. In FIG. 19, each of the quantization thresholds corresponding to the thick line 601, the dot line 602, the broken line 603 and the one-dot broken line 604 have the exceeding resemblance in their changes.

Figure 20:
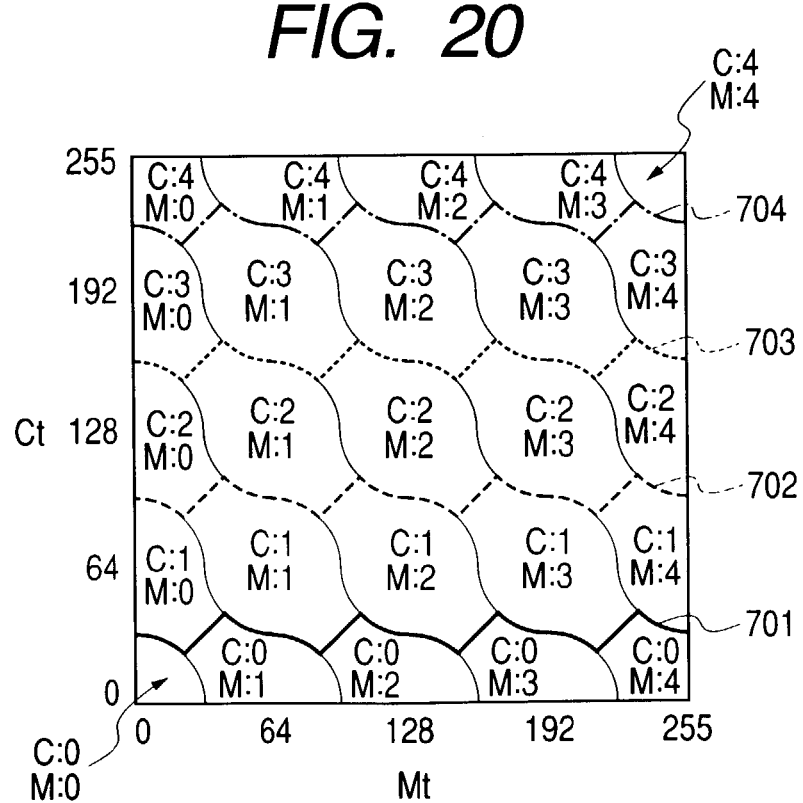
FIG. 20 is a view showing another example of the relationship between the quantization thresholds and the output quantization values of the cyan based on the magenta density value in the seventh embodiment of the present invention.

Another example of the relationship between the quantization thresholds and the output quantization values of the cyan based on the magenta density value in case of executing the error diffusion process in the five-valued data by combining the two or more colors after setting the more complex thresholds as compared with those in FIG. 19 is shown in FIG. 20. In FIG. 20, each of quantization thresholds corresponding to a thick line 701, a dot line 702, a broken line 703 and a one-dot broken line 704 have the exceeding resemblance in their changes similar to the case in FIG. 19.

Since these quantization thresholds nearly coincide with each other if the lines (values) are shifted in parallel, only the threshold tables of the thick lines 601 and 701 have to be held. Accordingly, almost the same result when the all tables (tables of the thick line 601 to the one-dot broken line 604 and the thick line 701 to the one-dot broken line 704) are held can be obtained by adding/subtracting a predetermined offset amount to/from the thresholds of the thick lines 601 and 701.

Next, an error diffusion method of decreasing the number of tables by giving the offset amount to the thresholds every gradation will be shown.

$$C_t = C + C_{err}$$

$$M_t = M + M_{err}$$

$$C_{th} = \text{Threshold\_Table}[M_t]$$

$$M_{th} = \text{Threshold\_Table}[C_t]$$

($C_{th}$: threshold of the density value $M_t$ of the M component
$M_{th}$: threshold of the density value $C_t$ of the C component)

$$C_{out} = 0$$

$$\text{if}(C_t > C_{th} + 0) C_{out} = 1$$

$$\text{if}(C_t > C_{th} + 64) C_{out} = 2$$

$$\text{if}(C_t > C_{th} + 128) C_{out} = 3$$

$$\text{if}(C_t > C_{th} + 192) C_{out} = 4$$

(0, 64, 128, 192: predetermined values)

$$M_{out} = 0$$

$$\text{if}(M_t > M_{th} + 0) M_{out} = 1$$

$$\text{if}(M_t > M_{th} + 64) M_{out} = 2$$

$$\text{if}(M_t > M_{th} + 128) M_{out} = 3$$

$$\text{if}(M_t > M_{th} + 192) M_{out} = 4$$

(0, 64, 128, 192: predetermined values)

According to the above method, since the number of threshold tables (Threshold_Table) to be held can be reduced to one as the minimum, a larger effect can be obtained as the number of output gradations, to which the error diffusion process is executed, becomes larger.

For example, in case of generating the five-valued data, the threshold table size ordinarily required corresponds to a threshold of 256×4=1024, while that size can be reduced to the level of ¼ which corresponds to a threshold of 256.

Further, when a case of generating the 17-valued data is considered, the threshold table size ordinarily required corresponds to a threshold of 256×16=4096, while that size can be reduced to the level of 1/16 which corresponds to a threshold of 256. Generally, the threshold table size can be reduced to the level of 1/(n−1) for a case of generating the n-valued data.

Since the number of times of referring a storage medium (ROM, RAM or the like) which stores the threshold tables is enough by one time, a merit capable of executing a high-speed process can be obtained.

Next, as indicated in the following expressions, the process can be also realized by a form of giving an offset amount to the density value to be quantized (perform modulation to the density value) on the basis of other component density value not depending on an idea of modulating the threshold. Accordingly, effects of reducing the table size and realizing a high-speed process can be obtained similar to the case of the above embodiments.

$$C_t = C + C_{err}$$

$$M_t = M + M_{err}$$

$$Ct_2 = C_t + \text{Modulation\_Table}[M_t]$$

$$Mt_2 = M_t + \text{Modulation\_Table}[C_t]$$

(Modulation_Table[$M_t$]: modulation table based on the density value $M_t$ of the M component
Modulation_Table[$C_t$]: modulation table based on the density value $C_t$ of the C component)

$$C_{out} = 0$$

$$\text{if}(C_{t2} > 31) C_{out} = 1$$

$$\text{if}(C_{t2} > 95) C_{out} = 2$$

$$\text{if}(C_{t2} > 159) C_{out} = 3$$

$$\text{if}(C_{t2} > 223) C_{out} = 4$$

(31, 95, 159, 223: predetermined values)

$$M_{out} = 0$$

$$\text{if}(M_{t2} > 31) M_{out} = 1$$

$$\text{if}(M_{t2} > 95) M_{out} = 2$$

$$\text{if}(M_{t2} > 159) M_{out} = 3$$

$$\text{if}(M_{t2} > 223) M_{out} = 4$$

(31, 95, 159, 223: predetermined values)

According to the above seventh embodiment, when the error diffusion process is executed to color image data as a pseudo-halftone process, since the threshold $C_{threshold}$ which is used in the error diffusion process of the C component is obtained on the basis of, for example, the density value $M_t$ of the M component in an objective pixel by the halftone processing module 34 and then a value C obtained by adding a predetermined value to the threshold $C_{threshold}$ is compared with the density value $C_t$ of the C component, even in an image processing form having the more increased number of gradations, a high-speed process can be executed while simply performing the more complex threshold setting, and further an error diffusion process of attaining the compact sized table information to be held can be realized.

Eighth Embodiment

In the seventh embodiment, the compact sized high-speed error diffusion process is realized by commonly utilizing the threshold table and the density value modulation table of each gradation and reducing the number of tables. However, in the present eighth embodiment, an error diffusion method, in which each of the threshold table and the density value modulation table itself is compacted, will be explained.

Figure 21:
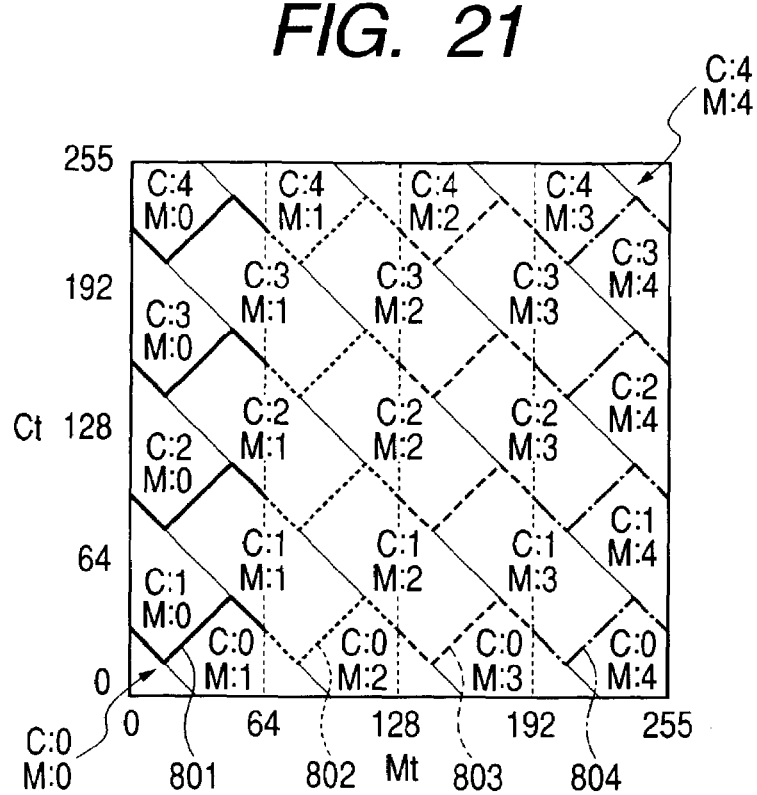
FIG. 21 is a view showing an example of the relationship between quantization thresholds group and output quantization values of the cyan based on a magenta density value in the eighth embodiment of the present invention.

FIG. 21 is a view showing an example of the relationship between quantization thresholds group and output quantization values of the cyan based on a magenta density value in the eighth embodiment of the present invention.

In FIG. 21, a thick line 801, a dot line 802, a broken line 803 and a one-dot broken line 804 indicate quantization thresholds group of the cyan based on the magenta density value $M_t$ in case of executing the error diffusion process in the five-valued data by combining the two or more colors.

In FIG. 21, the thick line 801 indicates the quantization thresholds group of the cyan when the magenta density value $M_t$ is in a range of $M_t<64$. The dot line 802 indicates the quantization thresholds group of the cyan when the magenta density value $M_t$ is in a range of $64 \leq M_t<128$. The broken line 803 indicates the quantization thresholds group of the cyan when the magenta density value $M_t$ is in a range of $128 \leq M_t<192$. The one-dot broken line 804 indicates the quantization thresholds group of the cyan when the magenta density value $M_t$ is in a range of $192 \leq M_t$. The four quantization thresholds groups of the thick line 801, the dot line 802, the broken line 803 and the one-dot broken line 804 have the exceeding resemblance in their changes.

Figure 22:
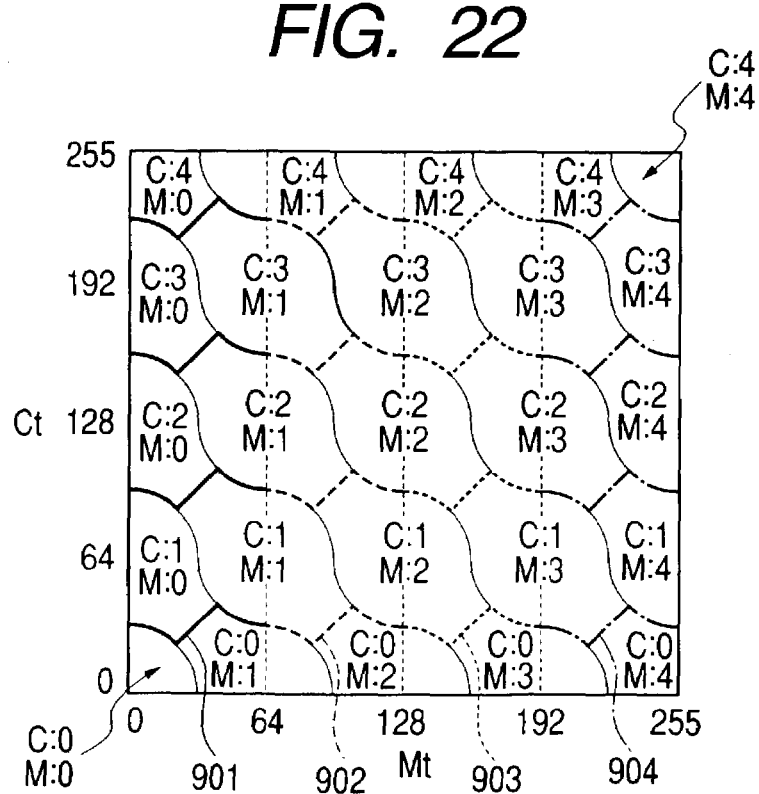
FIG. 22 is a view showing another example of the relationship between the quantization thresholds group and the output quantization values of the cyan based on the magenta density value in the eighth embodiment of the present invention.

Another example of the relationship between the quantization thresholds group and the output quantization values of the cyan based on the magenta density value $M_t$ in case of executing the error diffusion process in the five-valued data by combining the two or more colors after setting the more complex thresholds as compared with those in FIG. 21 is shown in FIG. 22. In FIG. 22, the four quantization thresholds groups of a thick line 901, a dot line 902, a broken line 903 and a one-dot broken line 904 have the exceeding resemblance in their changes similar to the case in FIG. 21.

Since these quantization thresholds groups nearly coincide with each other if the lines (values) are shifted in parallel, only the tables of the thick lines 801 and 901 have to be held as the threshold tables group. Accordingly, almost the same result when the all tables (tables of the thick line 801 to the one-dot broken line 804 and the thick line 901 to the one-dot broken line 904) are held can be obtained by referring the threshold tables of the thick lines 801 and 901 after modulating the magenta density value $M_t$ at the side to be referred.

Next, an error diffusion method of reducing the size of tables by referring the threshold tables after modulating the density value of other color will be shown.

$C_t=C+C_{err}$ $M_t=M+M_{err}$ $C_{cnv}$=Convert_Table[$C_t$] (first modulation density value)

$M_{cnv}$=Convert_Table[$M_t$] (second modulation density value)

(Convert_Table[$C_t$]: conversion table based on the density value $C_t$ of the C component
Convert_Table [$M_t$]: conversion table based on the density value $M_t$ of the M component)

$C_{out}=0$ if($C_t$>Threshold_Table1[$M_{cnv}$])$C_{out}=1$ if($C_t$>Threshold_Table2[$M_{cnv}$])$C_{out}=2$ if($C_t$>Threshold_Table3[$M_{cnv}$])$C_{out}=3$ if($C_t$>Threshold_Table4[$M_{cnv}$])$C_{out}=4$ (Threshold_Table1 to4[$M_{cnv}$]: quantization thresholds of the C based on the density value $M_t$ of the M component)

$M_{out}=0$ if($M_t$>Threshold_Table1[$C_{cnv}$])$M_{out}=1$ if($M_t$>Threshold_Table2[$C_{cnv}$])$M_{out}=2$ if($M_t$>Threshold_Table3[$C_{cnv}$])$M_{out}=3$ if($M_t$>Threshold_Table4[$C_{cnv}$])$M_{out}=4$ (Threshold_Table1 to 4[$C_{cnv}$]: quantization thresholds of the M based on the density value $C_t$ of the C component)

According to the above method, since the size of the threshold table (Threshold_Table) can be more reduced (in case of generating the n-valued data, the reduction is about $1/(n-1)$) as the number of gradations to be quantized becomes larger, a larger effect can be obtained as the number of output gradations, to which the error diffusion process is executed, becomes larger.

For example, in case of generating the five-valued data, the size of the threshold table ordinarily required corresponds to a threshold of $256 \times 4=1024$, while that size can be reduced to the level of $1/4$ which corresponds to a threshold of $256/(5-1) \times 4=256$.

Further, when a case of generating the 17-valued data is considered, the size of the threshold table ordinarily required corresponds to a threshold of $256 \times 16=4096$, while that size can be reduced to the level of $1/16$ which corresponds to a threshold of $256/(17-1) \times 16=256$. Generally, the size of the threshold table can be reduced to the level of $1/(n-1)$ for a case of generating the n-valued data.

In the eighth embodiment, as a method of modulating the density value of the magenta at the side to be referred, a modulation table previously obtained by the calculation expressed by the "Convert_Table[X]=X mod 64" is used by using the "Convert_Table[$C_t$]". However, it is not always required to perform the modulation as above, and the density value of the magenta at the side to be referred may be modulated by any method.

For example, the above Convert_Table[X] may be set under the condition of partition as below.

if(64>X)Convert_Table[X]=X if(128>X≧64)Convert_Table[X]=X-64 if(192>X≧128)Convert_Table[X]=X-128 if(X≧192)Convert_Table[X]=X-192

Then, a bit operation may be performed as indicated by "Convert_Table[X]=X & 0x003F". Further, it is not always required to refer the table which was previously obtained, but the process may be executed by performing the calculation, modulation and the conversion in real time.

According to the eighth embodiment, even in an image processing form having the more increased number of gradations, an error diffusion process of attaining the compact sized table information to be held can be realized, while simply performing the more complex threshold setting.

Ninth Embodiment

In the ninth embodiment, an error diffusion process, which is obtained by combining a method of the seventh embodiment with a method of the eighth embodiment, of attaining the more compact sized table information to be held will be explained.

Figure 23:
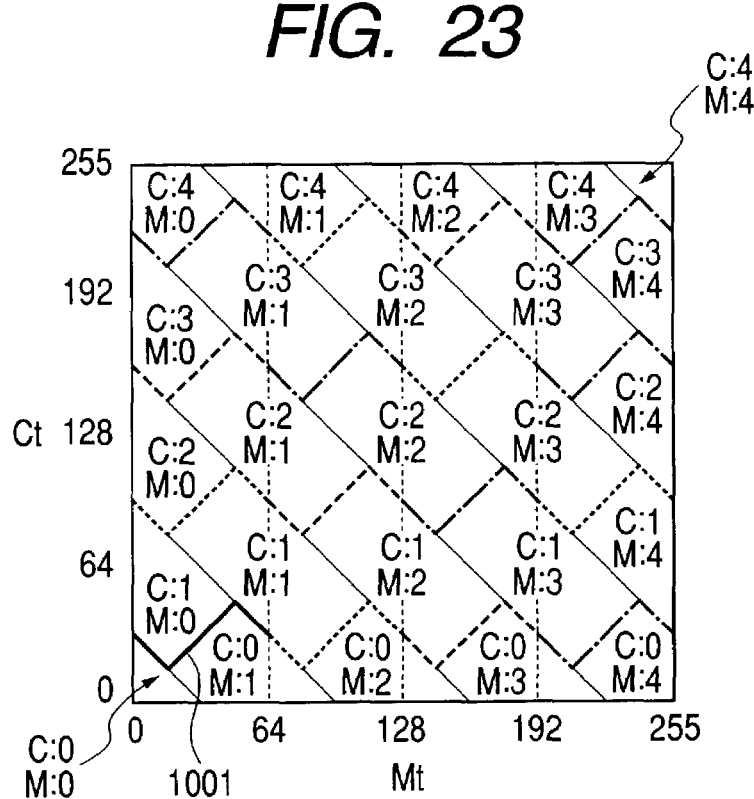
FIG. 23 is a view showing an example of the relationship between quantization thresholds and output quantization values of the cyan based on a magenta density value in the ninth embodiment of the present invention.

FIG. 23 is a view showing an example of the relationship between quantization thresholds and output quantization values of the cyan based on a magenta density value in the ninth embodiment of the present invention.

In FIG. 23, a thick line 1001, a dot line, a broken line and a one-dot broken line indicate quantization thresholds of the cyan based on the magenta density value $M_t$ in case of executing an error diffusion process in the five-valued data by combining the two or more colors. In FIG. 23, if a threshold indicated by the thick line 1001 is compared with thresholds indicated by other lines of the dot line, the broken line and the one-dot broken line, those thresholds have the exceeding resemblance in their changes.

Figure 24:
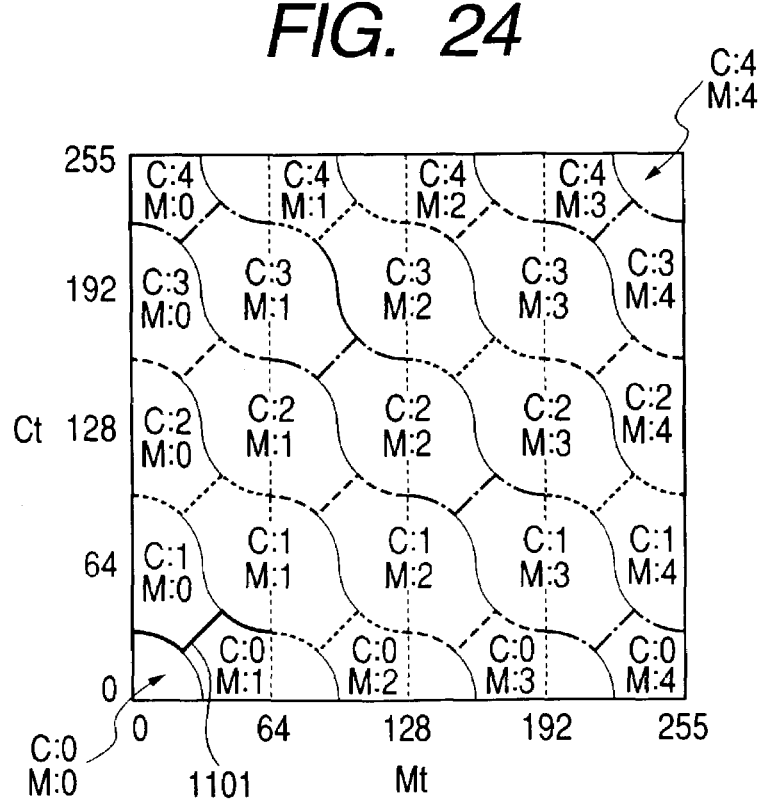
FIG. 24 is a view showing another example of the relationship between the quantization thresholds and the output quantization values of the cyan based on the magenta density value in the ninth embodiment of the present invention.

Another example of the relationship between the quantization thresholds and the output quantization values of the cyan based on the magenta density value $M_t$ in case of executing the error diffusion process in the five-valued data by combining the two or more colors after setting the more complex thresholds as compared with those in FIG. 23 is shown in FIG. 24. In FIG. 24, if a threshold indicated by a thick line 1101 is compared with thresholds group indicated by other lines of a dot line, a broken line and a one-dot broken line, those thresholds have the exceeding resemblance in their changes.

Since these quantization thresholds group nearly coincide with each other if the lines (values) are shifted in parallel, only the tables of the thick lines 1001 and 1101 have to be held as the threshold tables. Accordingly, almost the same result when the all thresholds groups including the dot lines, the broken line and the one-dot broken line are held can be obtained by adding/subtracting a predetermined offset amount to/from the thresholds of the thick lines 1001 and 1101 and further modulating the density value $M_t$ of the magenta at the side to be referred then referring the threshold tables of the thick lines 1001 and 1101.

In the following, an error diffusion method of reducing the number of tables and the table size by giving the offset amount to the thresholds every gradation and modulating the density value of the magenta at the side to be referred will be shown.

$C_t = C + C_{err}$ $M_t = M + M_{err}$ $C_{env} = \text{Convert\_Table}[C_t]$ $M_{env} = \text{Convert\_Table}[M_t]$ $C_{th} = \text{Threshold\_Table}[M_{env}]$ $M_{th} = \text{Threshold\_Table}[C_{env}]$ $C_{out} = 0$ if$(C_t > C_{th} + 0) C_{out} = 1$ if$(C_t > C_{th} + 64) C_{out} = 2$ if$(C_t > C_{th} + 128) C_{out} = 3$ if$(C_t > C_{th} + 192) C_{out} = 4$ $M_{out} = 0$ if$(M_t > M_{th} + 0) M_{out} = 1$ if$(M_t > M_{th} + 64) M_{out} = 2$ if$(M_t > M_{th} + 128) M_{out} = 3$ if$(M_t > M_{th} + 192) M_{out} = 4$ According to the above method, since the number of the threshold tables (Threshold_Table) to be held can be reduced to one as the minimum and the size of the threshold tables (Threshold_Table) can be more reduced (in case of generating the n-valued data, the reduction is about $1/(n-1)$) as the number of gradations to be quantized becomes larger, an effect of the present embodiment becomes larger as the number of output gradations, to which the error diffusion process is executed, becomes larger.

For example, in case of generating the five-valued data, the necessary size of the threshold table in an example of not applying the present embodiment corresponds a threshold of $256 \times 4 = 1024$, while, in the present embodiment, that size can be totally reduced to the level of $1/16$ which corresponds to a threshold of $256/(5-1) = 64$.

Further, when a case of generating the 17-valued data is considered, the necessary size of the threshold table in an example of not applying the present embodiment corresponds to a threshold of $256 \times 16 = 4096$, while, in the present embodiment, that size can be totally reduced to the level of $1/256$ which corresponds to a threshold of $256/(17-1) = 16$. Generally, the size of the threshold table can be reduced to the level of $1/(n-1)^2$ for a case of generating the n-valued data.

Similar to the case of the seventh embodiment, since the number of times of referring a storage medium (ROM, RAM or the like) which stores the threshold tables is enough by one-time, a merit capable of executing a high-speed process can be obtained. As described in the eighth embodiment, the density value of the magenta at the side to be referred may be modulated by any means.

As indicated in the following expressions, the process can be also realized by a form of giving an offset amount to the density value to be quantized (perform modulation to the density value) on the basis of other component density value and modulating the density value of the magenta at the side to be referred not depending on an idea of modulating the threshold. Accordingly, similar to the case of the first embodiment, effects of reducing the table size and realizing a high-speed process can be similarly obtained.

$C_t = C + C_{err}$ $M_t = M + M_{err}$ $C_{env} = \text{Convert\_Table}[C_t]$ $M_{env} = \text{Convert\_Table}[M_t]$ $C_{t2}=C_t+\text{Modulation\_Table}[M_{cnv}]$ $M_{t2}=M_t+\text{Modulation\_Table}[C_{cnv}]$ $C_{out}=0$ $\text{if}(C_{t2}>31)C_{out}=1$ $\text{if}(C_{t2}>95)C_{out}=2$ $\text{if}(C_{t2}>159)C_{out}=3$ $\text{if}(C_{t2}>223)C_{out}=4$ $M_{out}=0$ $\text{if}(M_{t2}>31)M_{out}=1$ $\text{if}(M_{t2}>95)M_{out}=2$ $\text{if}(M_{t2}>159)M_{out}=3$ $\text{if}(M_{t2}>223)M_{out}=4$ According to the ninth embodiment, even in an image process form having the more increased number of gradations, an error diffusion process capable of realizing a high-speed process and attaining the compact sized table information to be held can be realized while simply performing the more complex threshold setting.

Tenth Embodiment

In the seventh to ninth embodiments, the improvement in the more simple error diffusion method has been explained. However, in the tenth embodiment, the embodiment of improving the conventional example will be explained. In the above seventh to ninth embodiments, an effect of reducing the table size and an effect of improving the processing speed accompanied by the reduction of the table size have been explained. However, in the tenth embodiment, the simplification of the process and the improvement of the processing speed accompanied by the simplification will be mainly explained.

Figure 25:
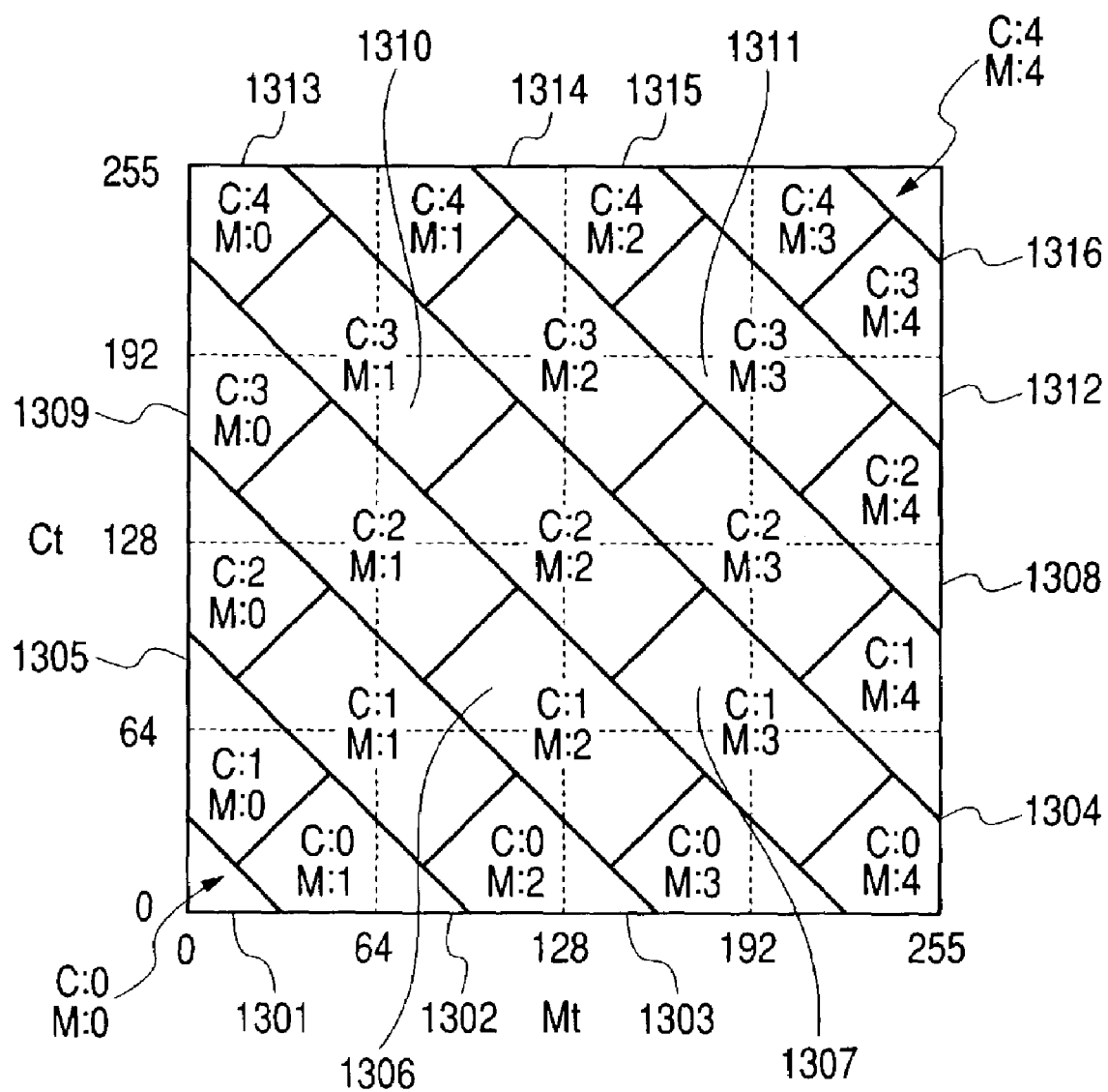
FIG. 25 is a view showing an example of the relationship between quantization thresholds and output quantization values of the cyan based on a magenta density value in the tenth embodiment of the present invention.

FIG. 25 is a view showing an example of the relationship between quantization thresholds and output quantization values of the cyan based on a magenta density value in the tenth embodiment of the present invention.

In FIG. 25, each of dot lines indicates a representative value of the quantization values. When each of areas 1301 to 1316 surrounded by the dot lines is compared with other areas, the areas corresponding to the thresholds have the exceeding resemblance each other. By forming the algorithm indicated by the following expressions, amount of the number to be compared does not vary even if there are various quantization gradation values. As a result, quite the simple process can be executed as compared with the process in the conventional example.

```
C_t = C + C_err
M_t = M + M_err
C_out = f (C_t)
M_out = g (M_t)
C_tm = h (C_t)
M_tm = i (M_t)
if (C_tm + M_tm > Threshold1)
    if (C_tm + M_tm < Threshold2)
        if (C_tm > M_tm)
            C_out = C_out + 1
        else
            M_out = M_out + 1
```

-continued

```
    else
        C_out = C_out + 1
        M_out = M_out + 1
```

In the present tenth embodiment, f(x), g(y), h(z) and i(w) are defined as follows.

f(x): the maximum value among quantization values of quantization representative values equal to or smaller than x g(y): the maximum value among quantization values of quantization representative values equal to or smaller than y h(z): z. (the maximum value among quantization representative values equal to or smaller than z)

i(w): w. (the maximum value among quantization representative values equal to or smaller than w).

Each of the above f(x), g(y), h(z) and i(w) may be used by calculation, comparison or the like, or may be obtained by referring to the table which was previously formed. Further, the same table, calculation, comparison or the like may be commonly held with the plural density values.

According to the tenth embodiment, even in an image processing form having the more increased number of gradations, an error diffusion process capable of executing a high-speed process and attaining the compact sized table information to be held can be realized.

Eleventh Embodiment

In the seventh to tenth embodiments, only the two colors of the cyan and magenta are treated. However, in the eleventh embodiment, an example of applying the present invention to the more various density values will be shown.

Algorithm in case of applying the above seventh embodiment to each of the cyan large droplet dark ink (Cl), the cyan large droplet light ink (cl), the cyan small droplet dark ink (Cs) and the cyan small droplet light ink (cs) and the magenta large droplet dark ink (Ml), the magenta large droplet light ink (ml), the magenta small droplet dark ink (Ms) and the magenta small droplet light ink (ms) is indicated by the following expressions.

$Cl_t=Cl+Cl_{err}$ $Cs_t=Cs+Cs_{err}$ $cl_t=cl+cl_{err}$ $cs_t=cs+cs_{err}$ $Ml_t=Ml+Ml_{err}$ $Ms_t=Ms+Ms_{err}$ $ml_t=ml+ml_{err}$ $ms_t=ms+ms_{err}$ $Cl_{out}=d(Cl_t)$ $Cs_{out}=e(Cs_t)$ $cl_{out}=f(cl_t)$ $cs_{out}=g(cs_t)$ $Ml_{out}=h(Ml_t)$ $Ms_{out}=i(Ms_t)$ $ml_{out} = j(ml_t)$ $ms_{out} = k(ms_t)$ if($Cl_t$>Threshold_Table[$Cs_t+cl_t+cs_t+Ml_t+Ms_t+ml_t+ms_t$])$Cl_{out}=1$ if($Cl_t$>Threshold_Table[$Cs_t+cl_t+cs_t+Ml_t+Ms_t+ml_t+ms_t$]+Offset)$Cl_{out}=2$ if($Cs_t$>Threshold_Table[$Cl_t+cl_t+cs_t+Ml_t+Ms_t+ml_t+ms_t$])$Cs_{out}=1$ if($Cs_t$>Threshold_Table[$Cl_t+cl_t+cs_t+Ml_t+Ms_t+ml_t+ms_t$]+Offset)$Cs_{out}=2$ if($cl_t$>Threshold_Table[$Cl_t+Cs_t+cs_t+Ml_t+Ms_t+ml_t+ms_t$])$cl_{out}=1$ if($cl_t$>Threshold_Table[$Cl_t+Cs_t+cs_t+Ml_t+Ms_t+ml_t+ms_t$]+Offset)$cl_{out}=2$ if($cs_t$>Threshold_Table[$Cl_t+Cs_t+cl_t+Ml_t+Ms_t+ml_t+ms_t$])$cs_{out}=1$ if($cs_t$>Threshold_Table[$Cl_t+Cs_t+cl_t+Ml_t+Ms_t+ml_t+ms_t$]+Offset)$cs_{out}=2$ if($Ml_t$>Threshold_Table[$Cl_t+Cs_t+cl_t+cs_t+Ms_t+ml_t+ms_t$])$Ml_{out}=1$ if($Ml_t$>Threshold_Table[$Cl_t+Cs_t+cl_t+cs_t+Ms_t+ml_t+ms_t$]+Offset)$Ml_{out}=2$ if($Ms_t$>Threshold_Table[$Cl_t+Cs_t+cl_t+cs_t+Ml_t+ml_t+ms_t$])$Ms_{out}=1$ if($Ms_t$>Threshold_Table[$Cl_t+Cs_t+cl_t+cs_t+Ml_t+ml_t+ms_t$]+Offset)$Ms_{out}=2$ if($ml_t$>Threshold_Table[$Cl_t+Cs_t+cl_t+cs_t+Ml_t+Ms_t+ms_t$])$ml_{out}=1$ if($ml_t$>Threshold_Table[$Cl_t+Cs_t+cl_t+cs_t+Ml_t+Ms_t+ms_t$]+Offset)$ml_{out}=2$ if($ms_t$>Threshold_Table[$Cl_t+Cs_t+cl_t+cs_t+Ml_t+Ms_t+ml_t$])$ms_{out}=1$ if($ms_t$>Threshold_Table[$Cl_t+Cs_t+cl_t+cs_t+Ml_t+Ms_t+ml_t$]+Offset)$ms_{out}=2$ By the above method, even in an image processing form having the more increased number of gradations among ink groups where the different colorant density of plural colors and the different ink discharge amount are observed, an error diffusion process capable of executing a high-speed process and attaining the compact sized table information to be held while simply performing the more complex thresholds setting can be realized.

Similarly, even if the above sixth to eleventh embodiments are applied to the ink groups where the different colorant density of plural colors and the different ink discharge amount are observed, an effect explained in each of the above embodiments can be obtained.

In the above seventh to eleventh embodiments, the error diffusion process is executed on the basis of the sum of the density value of at least the two density components. However, the error diffusion process is not limited to this method, and the same effect can be obtained even if the error diffusion process is executed on the basis of the maximum value in the density values of at least the two density components among plural density components.

In the above first to eleventh embodiments, the ink color is treated as two colors of the cyan and magenta, the colorant density is treated as two levels of the dark and light and the ink discharge amount is treated as two levels of the large and small. However, the present invention is not limited to the method. It is needless to say that the same effect can be obtained even if the present invention is applied to the case of the larger number of colors, the larger number of gradations of the quantization, the larger number of gradations of the colorant density and the larger number of gradations of the discharge amount.

In the above first to eleventh embodiments, droplets discharged from the recording head IJH are treated as ink and liquid held in the ink tank IT is treated as ink. However, it is not limited to this case. For example, in order to improve the fixing-ability or the water-resistance of an image to be recorded or improve the quality of the image, such chemical agents as processing liquid to be discharged to a recording medium may be held in the ink tank IT.

In the above first to eleventh embodiments, especially in an ink-jet recording system, the image output device 52 has means (for example, electric thermal converter, laser beam or the like) for generating the thermal energy which is utilized as energy for discharging the ink and uses a method of varying the ink condition by the generated thermal energy, thereby attaining to realize the high-density recording and the precise recording.

With respect to the representative structure and principle thereof, it is preferable to perform the method by using fundamental principles disclosed in, for example, specifications of U.S. Pat. Nos. 4,723,129 and 4,740,796. The method can be applied to any of, so-called, an on-demand type and a continuous type. Especially, in case of the on-demand type, an electric thermal converter is caused to generate the thermal energy by applying at least one drive signal, which gives the rapid temperature rise exceeding the nucleate boiling while corresponding to recording information, to the electric thermal converter correspondingly disposed to a sheet on which the liquid (ink) is held or a liquid path, then the film boiling is produced on a thermal affecting surface of a recording head. As a result, since bubbles in the liquid (ink) corresponding to the drive signal in one-to-one can be formed, effectiveness can be obtained. The liquid (ink) is discharged through an aperture for the discharge in accordance with growth and reduction of the bubbles and then at least the one droplet is formed. If the drive signal is formed into a pulse form, since the growth and reduction of the bubbles are simultaneously and appropriately performed, the discharging of the liquid (ink) excellent in response can be achieved, the more preferable state is obtained.

As the pulse-shaped drive signal, signals described in specifications of U.S. Pat. Nos. 4,463,359 and 4,345,262 are preferable. It should be noted that if the condition described in specifications of an invention related to the temperature rise on the thermal affecting surface shown in U.S. Pat. No. 4,313,124 is adopted, the more excellent recording can be performed.

As the structure of a recording head, the structure of using the constitution, in which the thermal affecting surface is disposed on a crooked area, disclosed in specifications of U.S. Pat. Nos. 4,558,333 and 4,459,600 is also included in the present invention other than the structure (straight-line liquid flow path or right-angle liquid flow path) of combining the discharging nozzle, the liquid path and the electric thermal converter as disclosed in each of the above specifications. In addition, the constitution based on Japanese Patent Application Laid-Open No. 59-123670 which discloses the structure, in which a common slot is treated as a discharging portion of electric thermal inverters for the plural electric thermal converters and based on Japanese Patent Application Laid-Open No. 59-138461 which discloses the structure, in which an aperture for absorbing a pressure wave of the thermal energy is corresponded to a discharging portion, is also available.

As a full-line type recording head having the length corresponding to the maximum width of a recording medium to which a recording process can be executed by a recording device, any of the structure in which the length condition is satisfied by the combination of plural recording heads as disclosed in the above specifications and the structure of unitedly formed by the one recording head is available.

In addition, not only a cartridge type recording head of unitedly providing an ink tank on the recording head itself explained in each of the above first to eleventh embodiments but also an exchangeable chip type recording head, in which the electrical connection with the device body and the ink supply from the device body can be realized by mounting the recording head on the device body, may be used.

Since a recording operation can be more stabilized by adding recovery means, preliminary means or the like for the recording head to the structure of the above-explained recording device, a desirable state is obtained. If these means are concretely enumerated, there are capping means, cleaning means, compressing or absorbing means, an electric thermal converter or another heater element, preliminary heating means structured by combining these means, and the like for the recording head. To provide a preliminary discharging mode which performs another discharging process besides a recording process is also effective in order to execute a stabilized recording process.

Further, as a recording mode of the recording device, not only the recording mode based on only the main color such as black or the like but also at least one of the recording mode based on plural different colors or full colors by the mixed colors can be provided in the recording device depending on either the structure of unitedly composing the recording head or the structure of combining plural recording heads. Then, the recording device is available.

In the above-explained embodiments, the explanation has been given on condition that the ink is in a state of liquid. However, the ink which solidifies at the room temperature or the less temperature, softens or liquefies at the room temperature may be used. In an ink-jet system, since it is general to perform a temperature control such that the ink viscosity stays within a stable discharging range by performing the temperature control to the ink itself so as to maintain the ink temperature to stay within a range of 30° C. to 70° C., the ink which liquefies when a using recording signal was given is available.

In addition, in order to prevent that the temperature risen by the thermal energy is positively used as energy of varying the ink state from the solid state to the liquid state or to prevent the evaporation of the ink, the ink which solidifies at the normal temperature and liquefies by the heating may be used. Anyway, the present invention is also applicable in case of using the ink which initially liquefies by giving the thermal energy as found in that the ink liquefies by giving the thermal energy in accordance with a recording signal and the liquefied ink is discharged or the ink already begins to solidify at a time point when the ink reaches a recording medium. In this case, the ink may be in such a form wherein the ink is opposite to the electric thermal converter with a state of being held as the liquid or the solid in a concave portion and a penetrating hole of a porous sheet as described in Japanese Patent Application Laid-Open Nos. 54-56847 or 60-71260. In the present invention, the most effective means for the above each ink is to execute the above film boiling method.

As a form of the image recording device according to the present invention, the image recording device which includes a form of a copying machine combined with a reader or the like or a facsimile apparatus having the transmission/reception functions is also available other than the device which is unitedly or separately provided as an image output terminal of an information processing apparatus such as a computer or the like.

The present invention is applicable to a system composed of plural equipments (e.g., a host computer, an interface equipment, a reader, a printer and the like) or to an apparatus including single equipment (e.g., a copying machine, a facsimile apparatus or the like).

It is needless to say that an object of the present invention can be achieved in a case where a storage medium (or recording medium) recording the program codes of software for realizing the functions of the above embodiments is supplied to a system or an apparatus and then a computer (or CPU or MPU) in the system or the apparatus reads and executes the program codes stored in the storage medium. In this case, the program codes themselves read from the storage medium realize the functions of the above embodiments, and the storage medium storing the program codes constitute the present invention.

It is needless to say that the present invention includes not only a case where the functions of the above embodiments are realized by the execution of the program codes read by the computer, but also a case where an OS (operating system) or the like functioning on the computer executes all the process or a part thereof according to the instructions of the program codes, thereby realizing the functions of the above embodiments.

Further, it is needless to say that the present invention also includes a case where the program codes read from the storage medium are once written in a memory provided in a function expansion card inserted in the computer or a function expansion unit connected to the computer, then a CPU or the like provided in the function expansion card or the function expansion unit executes all the process or a part thereof according to the instructions of the program codes, thereby realizing the functions of the above embodiments.

As explained above, according to the present invention, even in an image processing form having the more increased number of gradations, an error diffusion process capable of realizing a high-speed process with the simple structure and effectively functioning to the shift of dot apply positions can be executed.

Further, according to the present invention, even in an image processing form having the more increased number of gradations, a high-speed process can be executed, the compact sized table information to be held can be realized and an excellent image process can be executed to the shift of dot apply positions.

As many apparently widely different embodiments of the present invention can be made without departing from the spirit and scope thereof, it is to be understood that the invention is not limited to the specific embodiments thereof expect as defined in the appended claims.

What is claimed is:

1. An image processing apparatus which performs an error diffusion process to multivalued image data consisting of plural density components and outputs a result of the error diffusion process, comprising:
   first error diffusion means for performing the error diffusion process on the basis of a density value of a first density component included in the plural density components;
   second error diffusion means for performing the error diffusion process on the basis of the density value of the first density component and a density value of at least one of other density components included in the plural density components; and
   determination means for determining which of said first error diffusion means and said second error diffusion means should be used, in accordance with a predetermined condition.

2. An image processing apparatus according to claim 1, wherein, in a case where the density value of the first density component is within a predetermined area, said predetermined condition is a condition which has a characteristic that probability of using said first error diffusion means is higher than probability of using said second error diffusion means in an average in said predetermined area.

3. An image processing apparatus according to claim 2, wherein said predetermined area is an area which is included in at least one of an area where the density value of the first density component is equal to or smaller than a minimum value of a quantization representative value larger than 0 and an area where the density value of the first density component is equal to or larger than a second-largest quantization representative value.

4. An image processing apparatus according to claim 2, wherein said predetermined area is an area which includes at least one of an area where the density value of the first density component is equal to or smaller than a minimum value of a quantization representative value larger than 0 and an area where the density value of the first density component is equal to or larger than a second-largest quantization representative value.

5. An image processing apparatus which performs an error diffusion process to multivalued image data consisting of plural density components and outputs a result of the error diffusion process, comprising:
   first quantization means for performing quantization to the image data on the basis of a first density component included in the plural density components and outputting a result of the quantization as a first quantization result;
   determination means for determining a threshold on the basis of a density value of at least one of other density components included in the plural density components;
   comparison means for comparing the threshold determined by said determination means with the first density component and outputting a comparison result;
   second quantization means for outputting a second quantization result on the basis of the first quantization result output by said first quantization means and the comparison result output by said comparison means; and
   error diffusion execution means for performing the error diffusion process to the first density component on the basis of the second quantization result.

6. An image processing apparatus which performs an error diffusion process to multivalued image data consisting of plural density components and outputs a result of the error diffusion process, comprising:
   first quantization means for performing quantization to the image data on the basis of a first density component included in the plural density components and outputting a result of the quantization as a first quantization result;
   determination means for determining a threshold on the basis of a density value of at least one of other density components included in the plural density components;
   second quantization means for performing quantization to the image data on the basis of the threshold determined by said determination means and the first density component and outputting a result of the quantization as a second quantization result;
   selection means for selecting which of the first quantization result output by said first quantization means and the second quantization result output by said second quantization means should be used, in accordance with a predetermined condition; and
   error diffusion execution means for performing the error diffusion process on the basis of the quantization result selected by said selection means.

7. An image processing apparatus according to claim 6, wherein, in a case where the density value of the first density component is within a predetermined area, said predetermined condition is a condition which has a characteristic that probability of using the first quantization result is higher than probability of using the second quantization result in an average in said predetermined area.

8. An image processing apparatus according to claim 7, wherein said predetermined area is an area which is included in at least one of an area where the density value of the first density component is equal to or smaller than a minimum value of a quantization representative value larger than 0 and an area where the density value of the first density component is equal to or larger than a second-largest quantization representative value.

9. An image processing apparatus according to claim 7, wherein said predetermined area is an area which includes at least one of an area where the density value of the first density component is equal to or smaller than a minimum value of a quantization representative value larger than 0 and an area where the density value of the first density component is equal to or larger than a second-largest quantization representative value.

10. An image processing method which performs an error diffusion process to multivalued image data consisting of plural density components and outputs a result of the error diffusion process, comprising:
    a determination step of determining, in accordance with a predetermined condition, which of a first error diffusion means for performing the error diffusion process on the basis of a density value of a first density component included in the plural density components and a second error diffusion means for performing the error diffusion process on the basis of the density value of the first density component and a density value of at least one of other density components included in the plural density components should be performed.

11. An image processing method according to claim 10, wherein, in a case where the density value of the first density component is within a predetermined area, said predetermined condition is a condition which has a characteristic that probability of using the first error diffusion means is higher than probability of using the second error diffusion means in an average in said predetermined area.

12. An image processing method according to claim 11, wherein said predetermined area is an area which is included in at least one of an area where the density value of the first density component is equal to or smaller than a minimum value of a quantization representative value larger than 0 and an area where the density value of the first density component is equal to or larger than a second-largest quantization representative value.

13. An image processing method according to claim 11, wherein said predetermined area is an area which includes at least one of an area where the density value of the first density component is equal to or smaller than a minimum value of a quantization representative value larger than 0 and an area where the density value of the first density component is equal to or larger than a second-largest quantization representative value.

14. An image processing method which performs an error diffusion process to multivalued image data consisting of plural density components and outputs a result of the error diffusion process, comprising:
   a first quantization step of performing quantization to the image data on the basis of a first density component included in the plural density components and outputting a result of the quantization as a first quantization result;
   a determination step of determining a threshold on the basis of a density value of at least one of other density components included in the plural density components;
   a comparison step of comparing the threshold determined in said determination step with the first density component and outputting a comparison result;
   a second quantization step of outputting a second quantization result on the basis of the first quantization result output in said first quantization step and the comparison result output in said comparison step; and
   an error diffusion execution step of performing the error diffusion process to the first density component on the basis of the second quantization result.

15. The computer-readable storage medium on which is stored a computer-executable program that implements a method that performs an error diffusion process to multivalued image data consisting of plural density components and outputs a result of the error diffusion process, said method comprising:
   a first error diffusion step of performing the error diffusion process on the basis of a density value of a first density component included in the plural density components;
   a second error diffusion step of performing the error diffusion process on the basis of the density value of the first density component and a density value of at least one of other density components included in the plural density components; and
   a determination step of determining which of said first error diffusion step and said second error diffusion step should be performed, in accordance with a predetermined condition.

16. The computer-readable storage medium on which is stored a computer-executable program that implements a method that performs an error diffusion process to multivalued image data consisting of plural density components and outputs a result of the error diffusion process, said method comprising:
   a first quantization step of performing quantization to the image data on the basis of a first density component included in the plural density components and outputting a result of the quantization as a first quantization result;
   a determination step of determining a threshold on the basis of a density value of at least one of other density components included in the plural density components;
   a comparison step of comparing the threshold determined in said determination step with the first density component and outputting a comparison result;
   a second quantization step of outputting a second quantization result on the basis of the first quantization result output in said first quantization step and the comparison result output in said comparison step; and
   an error diffusion execution step of performing the error diffusion process to the first density component on the basis of the second quantization result.

17. An image processing apparatus which includes error diffusion processing means for performing an error diffusion process to multivalued image data consisting of plural density components, comprising:
   determination means for determining, in a case where the error diffusion process is performed to a first density component being one of the plural density components, a threshold to be used in the error diffusion process, on the basis of a density value of a second density component being at least one of the plural density components; and
   comparison means for comparing a value, obtained by adding a predetermined value to the threshold determined by said determination means, with a density value of the first density component, and outputting a comparison result,
   wherein said error diffusion processing means performs the error diffusion process on the basis of the comparison result output by said comparison means.

18. An image processing apparatus according to claim 17, wherein the first density component and the second density component are different from each other in respect of at least one of a color, a colorant density and a discharge amount.

19. An image processing apparatus which includes error diffusion processing means for performing an error diffusion process to multivalued image data consisting of plural density components, comprising:
   determination means for determining, in a case where the error diffusion process is performed to a first density component being one of the plural density components, a threshold to be used in the error diffusion process, on the basis of at least one of the sum of density values of second density components consisting of at least two of the plural density components and a maximum value of the density values of the second density components consisting of at least two of the plural density components; and
   comparison means for comparing a value, obtained by adding a predetermined value to the threshold determined by said determination means, with a density value of the first density component, and outputting a comparison result,
   wherein said error diffusion processing means performs the error diffusion process on the basis of the comparison result output by said comparison means.

20. An image processing apparatus which includes error diffusion processing means for performing an error diffusion process to multivalued image data consisting of plural density components, comprising:
   density modulation means for modulating, in a case where the error diffusion process is performed to a first density component being one of the plural density components, a density value of a second density component being at least one of the plural density components into a modulation density value;

determination means for determining a threshold to be used in the error diffusion process, on the basis of the modulation density value; and comparison means for comparing the threshold determined by said determination means with a density value of the first density component, and outputting a comparison result, wherein said error diffusion processing means performs the error diffusion process on the basis of the comparison result output by said comparison means.

21. An image processing apparatus which includes error diffusion processing means for performing an error diffusion process to multivalued image data consisting of plural density components, comprising:

density modulation means for modulating, in a case where the error diffusion process is performed to a first density component being one of the plural density components, at least one of the sum of density values of second density components consisting of at least two of the plural density components and a maximum value of the density values of the second density components consisting of at least two of the plural density components, into a modulation density value;

determination means for determining a threshold to be used in the error diffusion process, on the basis of the modulation density value; and comparison means for comparing the threshold determined by said determination means with a density value of the first density component, and outputting a comparison result, wherein said error diffusion processing means performs the error diffusion process on the basis of the comparison result output by said comparison means.

22. An image processing apparatus which includes error diffusion processing means for performing an error diffusion process to multivalued image data consisting of plural density components, comprising:

density modulation means for modulating, in a case where the error diffusion process is performed to a first density component being one of the plural density components, a density value of a second density component being at least one of the plural density components into a modulation density value;

determination means for determining a threshold to be used in the error diffusion process, on the basis of the modulation density value; and comparison means for comparing a value, obtained by adding a predetermined value to the threshold determined by said determination means, with a density value of the first density component, and outputting a comparison result, wherein said error diffusion processing means performs the error diffusion process on the basis of the comparison result output by said comparison means.

23. An image processing apparatus which includes error diffusion processing means for performing an error diffusion process to multivalued image data consisting of plural density components, comprising:

density modulation means for modulating, in a case where the error diffusion process is performed to a first density component being one of the plural density components, at least one of the sum of density values of second density components consisting of at least two of the plural density components and a maximum value of the density values of the second density components consisting of at least two of the plural density components, into a modulation density value;

determination means for determining a threshold to be used in the error diffusion process, on the basis of the modulation density value; and comparison means for comparing a value, obtained by adding a predetermined value to the threshold determined by said determination means, with a density value of the first density component, and outputting a comparison result, wherein said error diffusion processing means performs the error diffusion process on the basis of the comparison result output by said comparison means.

24. An image processing apparatus which includes error diffusion processing means for performing an error diffusion process to multivalued image data consisting of plural density components, comprising:

first density modulation means for modulating, in a case where the error diffusion process is performed to a first density component being one of the plural density components, a density value of the first density component as a first modulation density value; and second density modulation means for modulating a density value of a second density component being at least one of the plural density components, as a second modulation density value, wherein said error diffusion processing means performs the error diffusion process on the basis of the first modulation density value and the second modulation density value.

25. An image processing apparatus according to claim 24, wherein the first density component and the second density component are different from each other in respect of at least one of a color, a colorant density and a discharge amount.

26. An image processing apparatus which includes error diffusion processing means for performing an error diffusion process to multivalued image data consisting of plural density components, comprising:

modulation/output value determination means for modulating density values of at least two of the density components into modulation density values, and determining output values of at least the two of the plural density components; and final output value determination means for determining a final output value on the basis of the modulation density values and the output values respectively modulated and determined by said modulation/output value determination means, wherein said error diffusion processing means performs the error diffusion process on the basis of the final output value determined by said final output value determination means.

27. An image processing apparatus according to claim 26, wherein at least the two of the density components are different from each other in respect of at least one of a color, a colorant density and a discharge amount.

28. An image processing apparatus which includes error diffusion processing means for performing an error diffusion process to multivalued image data consisting of plural density components, comprising:

modulation/output value determination means for, in a case where the error diffusion process is performed to a density value of a first density component being one of the plural density components, modulating the density value of the first density component into a first modulation density value and determining an output value of the first density component;

modulation means for modulating a density value of a second density component being at least one of the plural density components into a second modulation density value; and final output value determination means for determining a final output value on the basis of the first modulation density value and the output value respectively modulated and determined by said modulation/output value determination means and the second modulation density value modulated by said modulation means, wherein said error diffusion processing means performs the error diffusion process on the basis of the final output value determined by said final output value determination means.

29. An image processing apparatus according to claim 28, wherein the first density component and the second density component are different from each other in respect of at least one of a color, a colorant density and a discharge amount.

30. An image processing apparatus which includes error diffusion processing means for performing an error diffusion process to multivalued image data consisting of plural density components, comprising:

modulation/output value determination means for, in a case where the error diffusion process is performed to a density value of a first density component being one of the plural density components, modulating the density value of the first density component into a first modulation density value and determining an output value of the first density component;

modulation means for modulating density values of at least two second density components in the plural density components into a second modulation density value; and final output value determination means for determining a final output value on the basis of at least one of the sum of the first modulation density value and the output value respectively modulated and determined by said modulation/output value determination means and a maximum value of the second modulation density value modulated by said modulation means, wherein said error diffusion processing means performs the error diffusion process on the basis of the final output value determined by said final output value determination means.

31. An image processing apparatus according to claim 30, wherein at least the two of the second density components are different from each other in respect of at least one of a color, a colorant density and a discharge amount.

32. An image processing method which includes an error diffusion processing step of performing an error diffusion process to multivalued image data consisting of plural density components, said method comprising:

a determination step of determining, in a case where the error diffusion process is performed to a first density component being one of the plural density components, a threshold to be used in the error diffusion process on the basis of a density value of a second density component being at least one of the plural density components; and a comparison step of comparing a value obtained by adding a predetermined value to the determined threshold with a density value of the first density component, and outputting a comparison result, wherein, in said error diffusion processing step, the error diffusion process is performed on the basis of the output comparison result.

33. The computer-readable storage medium on which is stored a computer-executable program that implements an image processing method which includes an error diffusion processing step of performing an error diffusion process to multivalued image data consisting of plural density components, said method comprising:

a determination step of determining, in a case where the error diffusion process is performed to a first density component being one of the plural density components, a threshold to be used in the error diffusion process on the basis of a density value of a second density component being at least one of the plural density components; and a comparison step of comparing a value obtained by adding a predetermined value to the determined threshold with a density value of the first density component, and outputting a comparison result, wherein, in said error diffusion processing step, the error diffusion process is performed on the basis of the output comparison result.

* * * * *

UNITED STATES PATENT AND TRADEMARK OFFICE
CERTIFICATE OF CORRECTION

PATENT NO. : 7,312,901 B2
APPLICATION NO. : 10/387424
DATED : December 25, 2007
INVENTOR(S) : Akitoshi Yamada et al.

It is certified that error appears in the above-identified patent and that said Letters Patent is hereby corrected as shown below:

COVER SHEET ITEM [57]:
    Abstract, Line 12, "in" should read -- if --.

COLUMN 1:
    Line 26, "factors W1," should read -- factors W0, --.

COLUMN 2:
    Line 32, "performing" should read -- performed --;
    Line 36, "performing" should read -- performed --; and
    Line 39, "performing" should read -- performed --.

COLUMN 4:
    Line 2, "human's" should read -- human --; and
    Line 43, "nents" should read -- nents and --.

COLUMN 7:
    Line 23, "51" should read -- 51 which --;
    Line 25, "connected" should read -- connected to --; and
    Line 66, "device 52" should read -- device 52 is --.

COLUMN 8:
    Line 53, "cartridge JJC" should read -- cartridge IJC --.

COLUMN 9:
    Line 7, "move" should read -- movement --;
    Line 11, "move" should read -- movement --; and
    Line 44, "there" should read -- there are --.

COLUMN 11:
    Line 22, "be overlapped" should read -- to be overlapped with --; and
    Line 24, "be overlapped" should read -- to be overlapped with --.

COLUMN 14:
    Line 29, "corresponded" should read -- corresponding --.

COLUMN 15:
    Line 19, "overlapped" should read -- overlapped with --; and
    Line 58, "is" should read -- are --.

UNITED STATES PATENT AND TRADEMARK OFFICE
CERTIFICATE OF CORRECTION

PATENT NO. : 7,312,901 B2
APPLICATION NO. : 10/387424
DATED : December 25, 2007
INVENTOR(S) : Akitoshi Yamada et al.

It is certified that error appears in the above-identified patent and that said Letters Patent is hereby corrected as shown below:

COLUMN 17:
  Line 65, Delete "that"; and
  Line 66, Delete "the".

COLUMN 18:
  Line 26, "that which the" should read -- which --.

COLUMN 20:
  Line 6, Delete "more".

COLUMN 21:
  Line 53, "if($cs_i$>Threshold_Table[$Cl_t$+$Cs_t$+$cl_t$+$Ml_t$+$Ms_t$+$Ml_t$+$ms_t$])$cs_{out}$=max(1, $cs_{out}$)" should read -- if($cs_i$>Threshold_Table[$Cl_t$+$Cs_t$+$cl_t$+$Ml_t$+$Ms_t$+$ml_t$+$ms_t$])$cs_{out}$=max(1, $cs_{out}$) --.

COLUMN 27:
  Line 43, "group" should read -- groups --.

COLUMN 29:
  Line 49, "resemblance" should read -- resemblance to --.

COLUMN 33:
  Line 52, "a using" should read -- using a --.

UNITED STATES PATENT AND TRADEMARK OFFICE
CERTIFICATE OF CORRECTION

PATENT NO. : 7,312,901 B2
APPLICATION NO. : 10/387424
DATED : December 25, 2007
INVENTOR(S) : Akitoshi Yamada et al.

It is certified that error appears in the above-identified patent and that said Letters Patent is hereby corrected as shown below:

<u>COLUMN 34:</u>
Line 31, "constitute" should read -- constitutes --.

Signed and Sealed this

Third Day of March, 2009

JOHN DOLL
*Acting Director of the United States Patent and Trademark Office*